United States Patent
Chen et al.

(10) Patent No.: US 12,513,325 B1
(45) Date of Patent: Dec. 30, 2025

(54) HINTS SELECTION FOR HARDWARE-BASED PYRAMIDAL MOTION ESTIMATION SEARCH

(71) Applicant: NVIDIA Corporation, Santa Clara, CA (US)

(72) Inventors: Jianjun Chen, Shanghai (CN); Chun Feng Yang, Shanghai (CN); Yongmao Tang, Shanghai (CN); Zejun Hu, Shanghai (CN); Wei Feng, Shanghai (CN)

(73) Assignee: NVIDIA CORPORATION, Santa Clara, CA (US)

( * ) Notice: Subject to any disclaimer, the term of this patent is extended or adjusted under 35 U.S.C. 154(b) by 2 days.

(21) Appl. No.: 18/893,119

(22) Filed: Sep. 23, 2024

(51) Int. Cl.
*H04N 19/52* (2014.01)
*H04N 19/105* (2014.01)
*H04N 19/119* (2014.01)
*H04N 19/139* (2014.01)
*H04N 19/172* (2014.01)
*H04N 19/176* (2014.01)
*H04N 19/31* (2014.01)
*H04N 19/573* (2014.01)

(52) U.S. Cl.
CPC .......... *H04N 19/52* (2014.11); *H04N 19/105* (2014.11); *H04N 19/119* (2014.11); *H04N 19/139* (2014.11); *H04N 19/172* (2014.11); *H04N 19/176* (2014.11); *H04N 19/31* (2014.11); *H04N 19/573* (2014.11)

(58) Field of Classification Search
CPC .... H04N 19/52; H04N 19/105; H04N 19/119; H04N 19/139; H04N 19/172; H04N 19/176; H04N 19/31; H04N 19/573

USPC ....................................................... 375/240.15
See application file for complete search history.

(56) References Cited

U.S. PATENT DOCUMENTS

| | | | | |
|---|---|---|---|---|
| 2023/0300338 A1* | 9/2023 | Noorkami | .............. | H04N 19/70 375/240.13 |
| 2024/0073438 A1* | 2/2024 | Wu | ....................... | H04N 19/513 |
| 2025/0071319 A1* | 2/2025 | Wang | ..................... | H04N 19/46 |

FOREIGN PATENT DOCUMENTS

| | | | | |
|---|---|---|---|---|
| CN | 106576170 A | * | 4/2017 | .......... H04N 19/567 |
| WO | WO-2013059504 A1 | * | 4/2013 | .......... H04N 19/176 |

* cited by examiner

*Primary Examiner* — Behrooz M Senfi
(74) *Attorney, Agent, or Firm* — Squire Patton Boggs LLP; Sarah Mirza

(57) ABSTRACT

Various embodiments include techniques for performing hardware-assisted motion estimation when encoding blocks of a media frame. A video encoder generates motion vector hints for multiple phases of motion estimation at increasingly finer resolutions until the final motion estimation phase at the full resolution of the media frame. The video encoder divides the media frame into a grid of grid blocks, where the grid blocks are smaller than the standard encoding block size of the media frame. At each phase, the video encoder generates one motion vector hint for each grid block at the selected resolution for that phase. For each motion vector hint, the video encoder generates forward prediction hint data based on a reference media frame previous to the current media frame. Further, for each motion vector hint, the video encoder generates backward prediction hint data based on a reference media frame that follows the current media frame.

20 Claims, 10 Drawing Sheets

HINTS SELECTION FOR HARDWARE-BASED PYRAMIDAL MOTION ESTIMATION SEARCH

BACKGROUND

Field of the Various Embodiments

Various embodiments relate generally to video encoding architectures and, more specifically, to improved hints selection for hardware-based pyramidal motion estimation search.

Description of the Related Art

When streaming live or prerecorded video, a first computing system, such as a server, a data center, a cloud storage system, and/or the like, transmits a video stream to a second computing system, such as a smart phone, a tablet computer, a laptop computer, and/or the like. Transmitting video streams between computing systems can consume a significant amount of network bandwidth, thereby reducing network bandwidth available for other uses. Therefore, a goal of computing systems that transmit video streams is to compress and encode video streams prior to transmission without substantially reducing video quality. Computing systems that receive such video streams decompress and decode the video streams prior to displaying the video streams on one or more display devices.

When encoding a video stream, a computing system may include a hardware video encoder that can generate motion vector hint data that predicts pixels of a current media frame based on corresponding pixels in one or more reference media frames. The reference media frames typically include the media frame that is immediately previous to and/or immediately following the current media frame. The video encoder divides each media frame included in the video stream into blocks, where each block includes a group of adjacent pixels of the media frame. Each block of adjacent pixels can be an 8×8 block of pixels, a 16×16 block of pixels, a 32×32 blocks of pixels, a 64×64 blocks of pixels, and/or the like. Depending on the video format used for encoding, these blocks are referred to as macroblocks, coding tree units (CTUs), and/or the like. To perform a full motion estimation search, the video generates a motion vector hint, also referred to as a motion vector, for each block of the current media frame. The video encoder searches each block of the reference media frame(s) to identify the block that contains pixel data that is closest to the pixel data of the current block in the current media frame. The video encoder analyzes the blocks of the previous media frame to perform forward motion estimation. Typically, the video encoder generates one motion vector hint for each block. Further, the video encoder generates motion vector hints such that each motion vector hint is shared for both forward motion estimation and backward motion estimation.

Over time, the resolution of media frames in video streams has increased, corresponding to the increasing processing capabilities and resolution of display devices on which those video streams are displayed. The resolution of image frames and video streams can be expressed by a format name and/or by the number of pixels per media frame, expressed as the number of pixels per pixel row by the number of pixel rows. For example, video stream and display device resolution has increased over time from 480p (progressive format with 720 pixels per pixel row by 480 pixel rows per media frame), to 720p (progressive format with 1280 pixels by 720 pixel rows), to 1080p (progressive format with 1920 pixels by 1080 pixel rows), 4k (progressive format with 3840 pixels by 2160 pixel rows), 8k (progressive format with 7680 pixels by 4320 pixel rows), and so on.

As the resolution of media frames has increased over time, so has the number of blocks included in each media frame. Consequently, performing a full motion estimation search for each block of each media frame can be computationally expensive, resulting in poor encoding performance and latency at higher resolutions. Consequently, some video encoders perform a hierarchical motion estimation technique known as pyramidal motion estimation. With pyramidal motion estimation, the video encoder iteratively generates motion vector hints in a series of phases, starting with a first phase at a low resolution and then subsequent phases at successively higher resolutions until the final phase at full resolution. Each phase is typically $\frac{1}{4}^{th}$ the resolution of the next phase. The video encoder generates motion vector hints for the final phase at the full resolution of the media frame. At each phase, the video encoder generates motion vector hints at a lower resolution and transmits the motion vector hint data as starting hint data for the next phase at a higher resolution. The video encoder scales the motion vector hint from the previous phase to the resolution for the next phase. The video encoder uses the scaled motion vector hints as a starting point for the motion estimation search for the next phase.

With this approach, a single motion vector hint for a block at one phase of motion estimation, when scaled to the resolution for the next phase, becomes a motion vector hint for multiple blocks at the next phase. For example, if the block size is 32×32 pixels, and the resolution for each phase is four times the resolution for the previous phase, a motion vector hint for a 32×32 pixel block becomes a motion estimation search starting point for four blocks (64×64 pixels) at the next phase. Similarly, if the block size is 64×64 pixels, and the resolution for each phase is four times the resolution for the previous phase, a motion vector hint for a 64×64 pixel block becomes a motion estimation search starting point for four blocks (128×128 pixels) at the next phase. As a result, at the next phase, the video encoder generates one motion vector hint for each group of 64×64 pixels (i.e., four blocks of 32×32 pixels), each group of 128×128 pixels (i.e., four blocks of 64×64 pixels), and/or the like.

One problem with this approach for performing motion estimation when encoding media frames is that a large group of pixels, such as a group of 64×64 pixels, a group of 128×128 pixels, and/or the like, can include multiple objects. The multiple objects can be stationary or moving in different directions, resulting in different motion for the different objects. However, because the video encoder only generates one motion vector hint for a large group of pixels, the motion of the different objects cannot be accurately estimated. As a result, the visual quality of the resulting media frames in the video stream can be negatively impacted, particularly in scenes where many small objects are concurrently moving in different directions from one media frame to the next.

Another problem with this approach is that the direction and speed of motion of an object between the previous media frame and the current media frame may be different than the direction and speed of motion of the object between the current media frame and the following current media frame. However, because each motion vector hint is shared for both forward motion estimation and backward motion estimation, the motion of an object previous to and following the current media frame cannot be accurately estimated. As a result, the visual quality of the resulting media frames in the video stream can be further negatively impacted, particularly in scenes where objects are rapidly changing in speed and/or direction from one media frame to the next.

As the foregoing illustrates, what is needed in the art are more effective techniques for performing motion estimation when encoding blocks of a media frame by a video encoder in a computing system.

SUMMARY

Various embodiments of the present disclosure set forth a computer-implemented method for performing motion estimation when encoding blocks of a current media frame. The method includes selecting a first resolution that is coarser than the full resolution of the current media frame. The method further includes dividing the current media frame into a first grid of grid blocks at the first resolution, where each grid block included in the first grid of grid blocks is smaller than an encoding block size of the current media frame. The method further includes generating a first motion vector hint for a first grid block included in the first grid of grid blocks based on a plurality of reference media frames. With the various embodiments, the first motion vector hint is subsequently accessed to generate a second motion vector hint at a second resolution that is finer than the first resolution.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, the video encoder generates multiple motion vector hints, such as four hints or sixteen hints, for each block of a media frame. As a result, the video encoder can generate media frames for a video stream with improved visual quality relative to prior approaches, particularly in scenes where many small objects are concurrently moving in different directions from one media frame to the following media frame. Further, the video encoder generates motion vector hints with separate motion vector hint data for forward prediction and backward prediction. As a result, the video encoder can generate media frames for a video stream with improved visual quality relative to prior approaches, particularly in scenes where objects are rapidly changing in speed and/or direction from one media frame to the following media frame. With these techniques, either alone or in combination, the video encoder can perform motion improved prediction accuracy for each subsequent phase of pyramidal motion estimation, leading to better visual quality of the resulting video stream. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
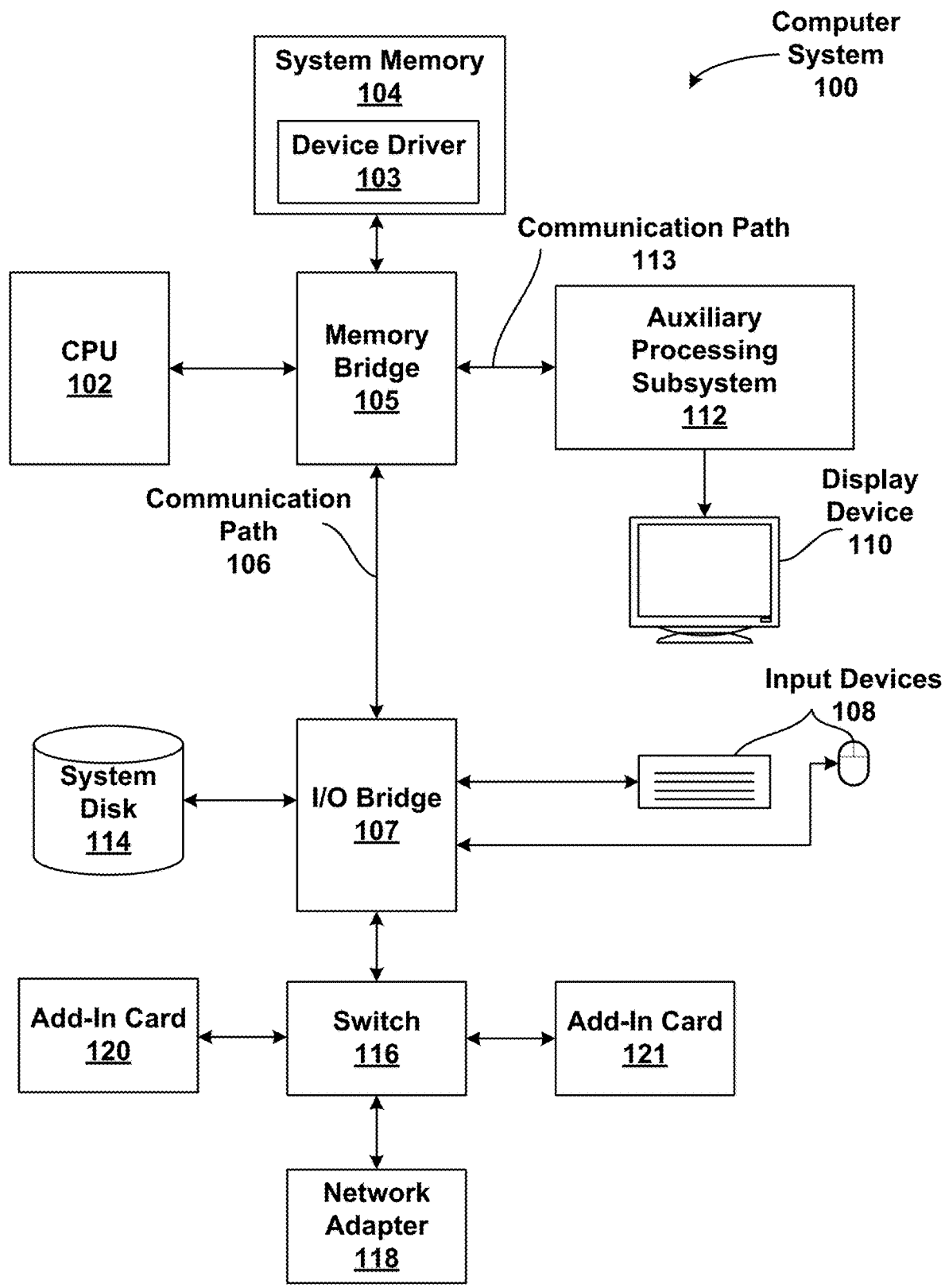
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102 and a system memory 104 coupled to an auxiliary processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computing system 100 to authorized users and deny access of computing system 100 to unauthorized users. Switch 116 is configured to provide connections between I/O bridge 107 and other components of the computing system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and auxiliary processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, Peripheral Component Interconnect Express (PCIe), HyperTransport, or any other bus or point-to-point communication protocol known in the art.

In some embodiments, auxiliary processing subsystem 112 comprises a graphics subsystem that delivers pixels to a display device 110 that may be any conventional cathode ray tube, liquid crystal display, light-emitting diode display, or the like. In such embodiments, the auxiliary processing subsystem 112 incorporates circuitry optimized for graphics and video processing, including, for example, video output circuitry. As described in greater detail below in FIG. 2, such circuitry may be incorporated across one or more auxiliary processors included within auxiliary processing subsystem 112. An auxiliary processor includes any one or more processing units that can execute instructions such as a reduced instruction set computer (RISC) processor, central processing unit (CPU), a parallel processing unit (PPU) of FIGS. 2-3, a graphics processing unit (GPU), a direct memory access (DMA) unit, an intelligence processing unit (IPU), a neural processing unit (NAU), a tensor processing unit (TPU), a neural network processor (NNP), a data processing unit (DPU), a vision processing unit (VPU), an application specific integrated circuit (ASIC), a field-programmable gate array (FPGA), and/or the like.

In some embodiments, auxiliary processing subsystem 112 includes two processors, referred to herein as a primary processor (normally a CPU) and a secondary processor. Typically, the primary processor is a CPU and the secondary processor is a GPU. Additionally or alternatively, each of the primary processor and the secondary processor may be any one or more of the types of auxiliary processors disclosed herein, in any technically feasible combination. The secondary processor receives secure commands from the primary processor via a communication path that is not secured. The secondary processor accesses a memory and/or other storage system, such as such as system memory 104, Compute eXpress Link (CXL) memory expanders, memory managed disk storage, on-chip memory, and/or the like. The secondary processor accesses this memory and/or other storage system across an insecure connection. The primary processor and the secondary processor may communicate with one another via a GPU-to-GPU communications channel, such as Nvidia Link (NVLink). Further, the primary processor and the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the auxiliary processing subsystem 112 incorporates circuitry optimized for general purpose and/or compute processing. Again, such circuitry may be incorporated across one or more auxiliary processors included within auxiliary processing subsystem 112 that are configured to perform such general purpose and/or compute operations. In yet other embodiments, the one or more auxiliary processors included within auxiliary processing subsystem 112 may be configured to perform graphics processing, general purpose processing, and compute processing operations. System memory 104 includes at least one device driver 103 configured to manage the processing operations of the one or more auxiliary processors within auxiliary processing subsystem 112.

In various embodiments, auxiliary processing subsystem 112 may be integrated with one or more other the other elements of FIG. 1 to form a single system. For example, auxiliary processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of auxiliary processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, auxiliary processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
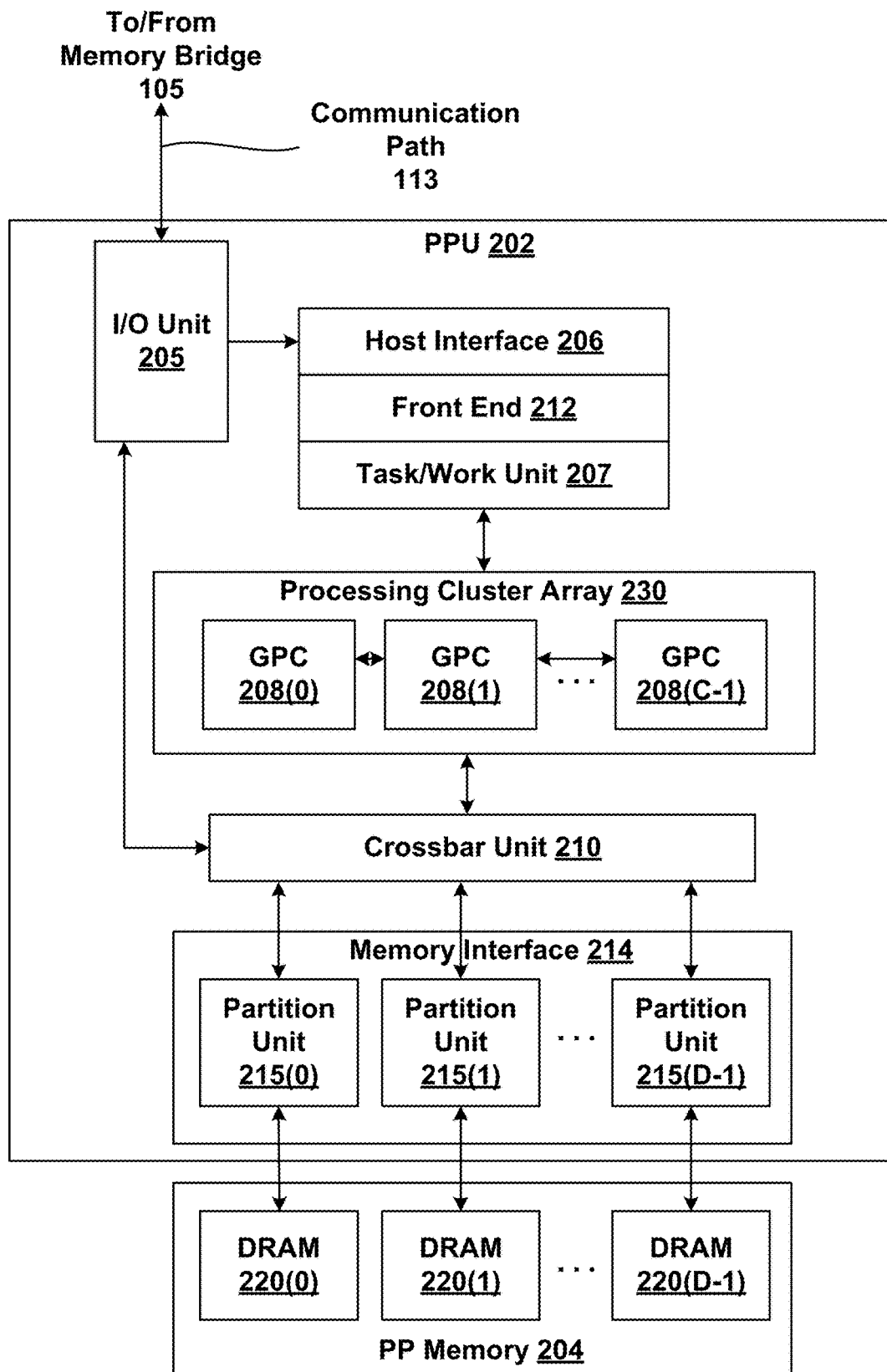
FIG. 2 is a block diagram of a parallel processing unit (PPU) included in the auxiliary processing subsystem of FIG. 1, according to various embodiments.

FIG. 2 is a block diagram of a parallel processing unit (PPU) 202 included in the auxiliary processing subsystem 112 of FIG. 1, according to various embodiments. Although FIG. 2 depicts one PPU 202, as indicated above, auxiliary processing subsystem 112 may include any number of PPUs 202. Further, the PPU 202 of FIG. 2 is one example of an auxiliary processor included in auxiliary processing subsystem 112 of FIG. 1. Alternative auxiliary processors include, without limitation, RISCs, CPUs, GPUs, DMA units, IPUs, NPUs, TPUs, NNPs, DPUs, VPUs, ASICS, FPGAS, and/or the like. The techniques disclosed in FIGS. 2-3 with respect to PPU 202 apply equally to any type of auxiliary processor (s) included within auxiliary processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computing system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or auxiliary processors other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computing system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computing system 100 may be varied. In some embodiments, auxiliary processing subsystem 112, which includes at least one PPU 202, is implemented as an add-in card that can be inserted into an expansion slot of computing system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within auxiliary processing subsystem 112, or another auxiliary processing subsystem 112 within computing system 100.

As noted above, any number of PPUs 202 may be included in an auxiliary processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
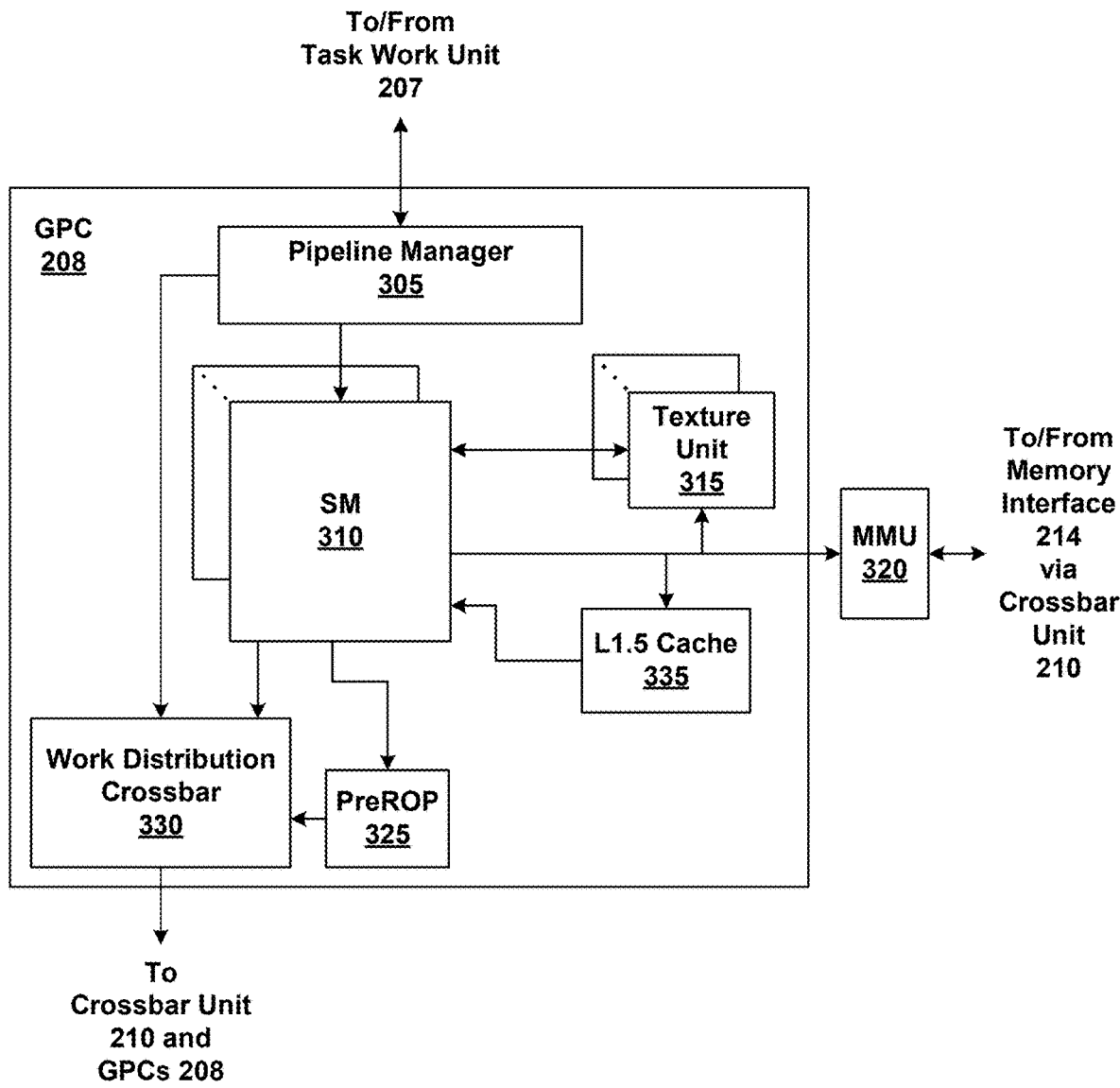
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), PP memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, PP memory 204, or system memory 104. Please also note, as used herein, references to cache memory may include any one or more technically feasible memories, including, without limitation, an L1 cache, an L1.5 cache, and the L2 caches.

Improved Hints Selection for Hardware-Based Pyramidal Motion Estimation Search for a Media Frame Various embodiments include a video encoder that generates multiple motion vector hints for each block of pixels in a media frame of a video stream. The video encoder divides the media frame into a grid size that is smaller than the block size. For example, the video encoder can divide the media frame into a grid of 16×16 pixel grid blocks. If the media frame includes blocks of 32×32 pixels, then the video encoder generates four motion vector hints for each block (one motion vector hint for each of the four 16×16 pixel grid blocks in the 32×32 pixel block). Similarly, if the media frame includes blocks of 64×64 pixels, then the video encoder generates sixteen motion vector hints for each block (one motion vector hint for each of the sixteen 16×16 pixel grid blocks in the 64×64 pixel block). Further, the video encoder generates each motion estimate hint with separate motion vector hint data for forward prediction and backward prediction.

Figure 4:
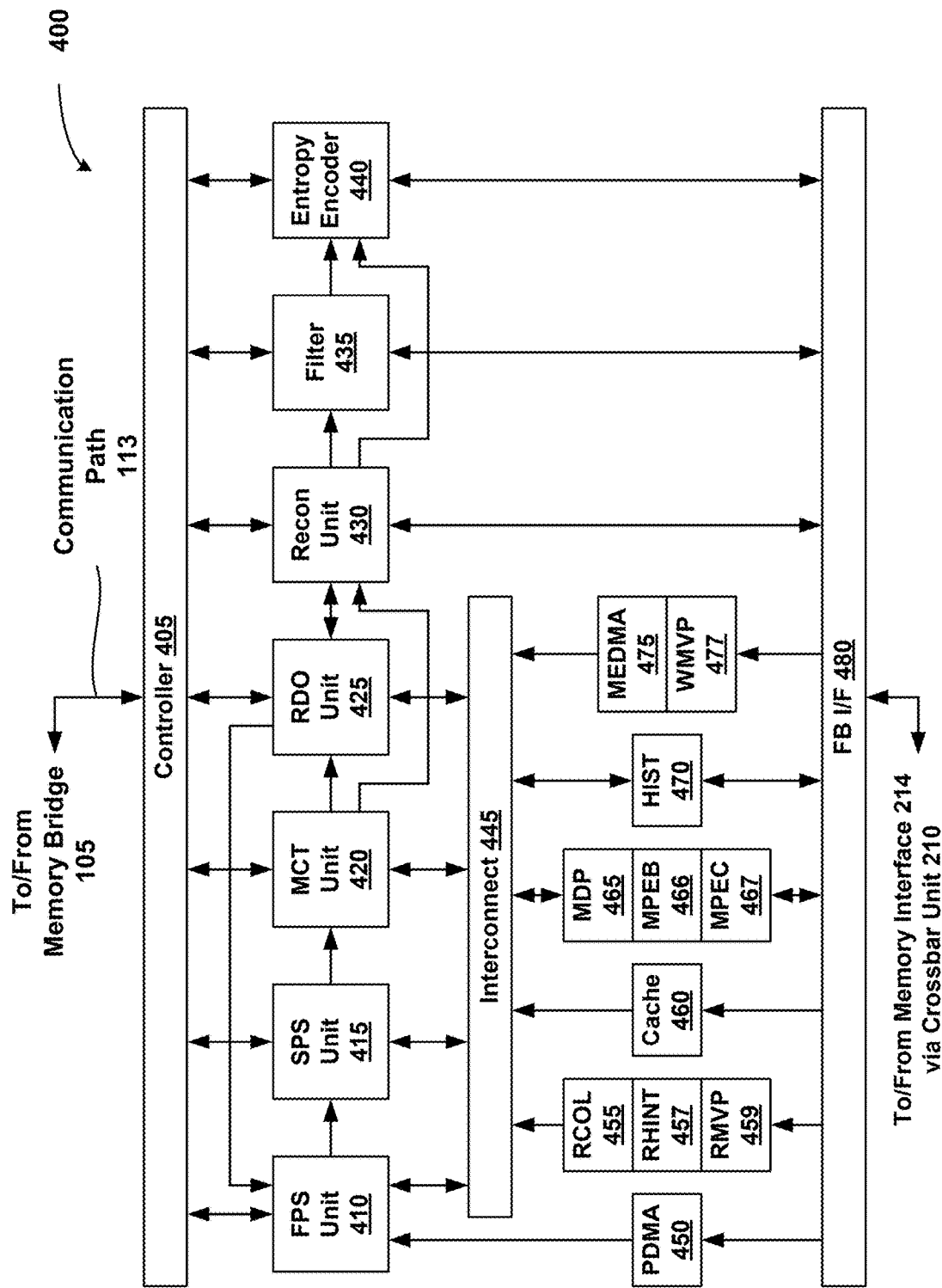
FIG. 4 is a block diagram of a video encoder configured to generate and process encoding data for multiple blocks of a media frame for the computing system of FIGS. 1-3, according to various embodiments.

FIG. 4 is a block diagram of a video encoder 400 configured to generate and process encoding data for multiple blocks of a media frame for the computing system 100 of FIGS. 1-3, according to various embodiments. As shown, video encoder 400 includes, without limitation, a controller 405, a full-pixel search (FPS) unit 410, a sub-pixel search (SPS) unit 415, a motion compensation filter type selection (MCT) unit 420, a rate-distortion optimization (RDO) unit 425, a reconstruction (recon) unit 430, a filter 435, an entropy encoder 440, an interconnect 445, a pixel direct memory access (DMA) (PDMA) unit 450, a read collocated motion vector (RCOL) unit 455, an external motion vector hints DMA (RHINT) unit 457, a read motion vector predictor (RMVP) unit 459, a cache memory (cache) 460, a mode decision processor (MDP) 465, a multimedia pipeline encoder B (MPEB) unit 466, a multimedia pipeline encoder C (MPEC) unit 467, a history (HIST) unit 470, a motion estimation DMA (MEDMA) unit 475, a write motion vector predictor (WMVP) unit 477, and a frame buffer interface (FB I/F) 480.

Various units of video encoder 400 communicate with each other via interconnect 445. These various units include FPS unit 410, SPS unit 415, MCT unit 420, RDO unit 425, RCOL unit 455, RHINT unit 457, RMVP unit 459, cache memory 460, MDP unit 465, MPEB unit 466, MPEC unit 467, history unit 470, MEDMA unit 475, WMVP unit 477, and/or the like. Interconnect 445 can include any suitable connection bus, mesh, network, point-to-point connections, and/or the like for transmitting and receiving data between and among these units of video encoder 400.

Video encoder 400 can be configured to encode video in conformance to any one or more video encoding formats. In some embodiments, video encoder 400 can encode a video stream compatible with the advanced video coding (AVC) format also known as H.264 format or motion picture experts group 4 (MPEG-4) Part 10 format. Additionally or alternatively, video encoder 400 can encode a video stream compatible with the high efficiency video coding (HEVC) format also known as H.265 format or motion picture experts group high efficiency (MPEG-H) Part 2 format. Additionally or alternatively, video encoder 400 can encode a video stream compatible with the Video comPression 9 (VP9) format and/or with the Alliance for Open Media (AOMedia) Video 1 (AV1) format. Additionally or alternatively, video encoder 400, as is and/or with slight modification, can encode a video stream compatible with any other technically feasible video encoding format including, without limitation, motion joint pictures experts group (JPEG) 2000 (MJ2), MPEG-2 or H.262, H.263v2 or H.263+, video coding 1 (VC-1 or SMPTE 421), versatile video coding (VVC or H.266), VP8, VP10, and/or the like.

In some embodiments, certain units of video encoder 400 can be general encoding units that support operations for encoding video into multiple encoding formats. Additionally or alternatively, certain units of video encoder 400 can be format-specific encoding units that support operations for encoding video into a single encoding format or into two or three related encoding formats. For example, general encoding units of video encoder 400 can include, without limitation, FPS unit 410, SPS unit 415, MCT unit 420, PDMA unit 450, RCOL unit 455, RHINT unit 457, RMVP unit 459, cache memory 460, MEDMA unit 475, WMVP unit 477, and/or the like. Additionally or alternatively, format-specific encoding units of video encoder 400 that support operations for encoding video into H.264 format and/or H.265 format can include, without limitation, MDP unit 465, MPEB unit 466, MPEC unit 467, history unit 470, and/or the like. Additionally or alternatively, format-specific encoding units of video encoder 400 that support operations for encoding video into AV1 format and/or VP9 format can include, without limitation, RDO unit 425, reconstruction unit 430, filter 435, entropy encoder 440, and/or the like.

In operation, controller 405 encodes media frames in a video stream, in conjunction with other units and/or components of video encoder 400. Controller 405 can include any of one or more processors that can execute instructions including, without limitation, a microcontroller, a RISC processor, a CPU, a PPU, a GPU, a DMA unit, an IPU, an NAU, a TPU, a NNP, a DPU, a VPU, an ASIC, an FPGA, and/or the like. Controller 405 can include memory to store instructions that can program controller 405 to perform various operations described herein. Controller 405 can further include memory for storing data associated with those operations. In that regard, CPU 102, auxiliary processing subsystem 112, and/or the like can store instructions and/or data in the memory of controller 405 through memory bridge 105 via communication path 113. Similarly, controller 405 can communicate with memory bridge 105 via communication path 113. Through memory bridge 105, controller 405 can communicate with various other units and/or components of computing system 100.

Further, controller 405 can communicate with various units and/or components of video encoder 400 including, without limitation, FPS unit 410, SPS unit 415, MCT unit 420, RDO unit 425, reconstruction unit 430, filter 435, entropy encoder 440, and/or the like. Controller 405 can configure one or more of the units of video encoder 400. Further, controller 405 can control execution and operation of one or more of the units of video encoder 400, including various operations to encode media frames of a video stream. Controller 405 can receive data from the units of video encoder 400 resulting from performing these various operations.

Media frames can be divided into block rows, where each block row includes a set of blocks spanning from the left edge to the right edge of the media frame. Depending on the format being employed by video encoder 400, the blocks can be referred to as macroblocks, coding tree units (CTUs), coding tree blocks (CTBs), superblocks, and/or the like. In some embodiments, video encoder 400 encodes a video stream in H.264 format, where media frames are divided into 16×16 pixel macroblocks. In some embodiments, video encoder 400 encodes a video stream in HEVC format, where media frames are divided into 32×32 pixel coding tree blocks. In some embodiments, video encoder 400 encodes a video stream in AV1 format, where media frames are divided into 64×64 pixel superblocks. In various formats, including HEVC, AV1, and/or the like, video encoder 400 generates predictions or hints on a coding unit granularity. In some embodiments, a coding unit is a square pixel block of various sizes including, without limitation 16×16 pixel coding units, 32×32 pixel coding units, 64×64 pixel coding units, and/or the like. In various formats, including HEVC, AV1, and/or the like, video encoder 400 generates predictions or hints on a prediction unit granularity. In some embodiments, a prediction unit is a rectangular pixel block of various sizes including, without limitation 8×16 pixel prediction units, 16×8 pixel prediction units, 16×32 pixel prediction units, 32×16 pixel prediction units, and/or the like. In some embodiments, a prediction unit is a square pixel block of various sizes including, without limitation 16×16 pixel prediction units, 32×32 pixel prediction units, 64×64 pixel prediction units, and/or the like.

Controller 405, in conjunction with other units and/or components of video encoder 400, can control various operations to generate interframe candidates for media frames of a video stream. To generate an interframe candidate, controller 405 performs motion estimation and/or motion compensation for a block included in a media frame of the video stream. Controller 405 performs motion estimation and/or motion compensation to generate an interframe candidate for the specified block based on temporal redundancy between media frames. More specifically, controller 405 performs one or both of full-pixel search, in conjunction with FPS unit 410, and/or subpixel search, in conjunction with SPS unit 415. Controller 405 performs one or both of these searches by searching a reference media frame, such as the previous media frame and/or the following media frame, for blocks that match corresponding blocks in the current media frame being encoded. A block in the reference media frame matches the block in the current media frame if the pixel data of the block in the reference media frame is the same as, or similar to, the pixel data of the current block in the current media frame. The matching block is the block in the reference media frame with pixel data that is closest to the pixel data of the block in the current media frame. If the objects in the scene have not moved and the camera view has not changed between the reference media frame and the current media frame, then the location of the current block within the current media frame can be the same as the location of the matching block in the reference media frame. If, however, the objects in the scene have moved and/or the camera view has changed between the reference media frame and the current media frame, then the location of the current block within the current media frame can be different from the location of the matching block in the reference media frame. Controller 405 generates a motion vector for the current block in the current media frame that identifies the location of the matching block in the reference media frame. Motion compensation predicts the pixels of a current media frame based on a previous media frame and/or a following media frame by determining effects caused by motion of the camera capturing the video stream and/or motion of objects within the scene captured by the camera. Controller 405 generates difference data, also referred to as residue data, that specifies the differences between the pixel data of the matching block in the reference media frame and the pixel data of the current block in the current media frame. As the similarity of the pixel data of the block in the reference media frame to the pixel data of the current block increases, the amount of difference data decreases, resulting in a low interframe cost. Conversely, as the similarity of the pixel data of the block in the reference media frame to the pixel data of the current block decreases, the amount of difference data increases, resulting in a high interframe cost.

Controller 405 generates a motion vector for the current block that is predictive of the block of the current media frame from the corresponding block of a reference media frame. Controller 405, in conjunction with other units and/or components of video encoder 400, generates motion vector prediction data, also referred to as motion vector hint data or, simply, hint data, for each media frame. This hint data includes forward prediction hint data and backward prediction hint data. Controller 405 generates forward prediction hint data based on block data for a current block and block data for a previous corresponding block of the previous media frame. Likewise, controller 405 generates backward prediction hint data based on block data for the current block and block data for a following corresponding block of the following media frame. Video encoder 400 can use the motion vector data as an interframe candidate. Based on the motion vector data, controller 405 generates motion compensated pixels for the interframe candidate.

Depending on the encoding format currently being employed, controller 405 transmits motion vector data and/ or pixel block data to MDP unit 465, MPEB unit 466, and/or MCT unit 420. When encoding in certain formats, such as H.264, H.265, and/or the like, controller 405 transmits motion vector data and/or pixel block data to MDP unit 465 and MPEB unit 466. When encoding in certain other formats, such as AV1 and/or the like, controller 405 transmits motion vector data and/or pixel block data to MCT unit 420.

Further, controller 405, in conjunction with other units of video encoder 400, can control various operations to generate intraframe candidates for media frames of a video stream. To generate an intraframe candidate, controller 405 performs intraframe estimation and/or intraframe prediction to generate an intraframe candidate for the specified block based on spatial redundancy within a media frame.

To perform intraframe estimation, controller 405 selects an intraframe prediction mode based on the current pixels in the current media frame and on the neighboring pixels of the reconstructed current media frame. In some embodiments, controller 405 can select the intraframe prediction mode that best predicts the pixels of the current block. Controller 405 can select the intraframe prediction mode that results in the lowest rate-distortion cost value based on the sum of square errors (SSE) distortion for the current block as determined by rate-distortion optimization unit 425. The number and type of available prediction modes can vary based on the block size. For example, the number and type of available prediction modes can be different among 4×4 pixel blocks, 8×8 pixel blocks, 16×16 pixel blocks, 32×32 pixel blocks, and/or the like. In that regard, controller 405 can select different intraframe prediction modes for each of the possible block sizes based on what intraframe prediction mode results in lowest rate-distortion cost value determined by rate-distortion optimization unit 425 for the respective block size. Further, controller 405 can select different intraframe prediction modes for the luma values in the block versus the chroma samples in the block. In some embodiments, the intraframe prediction mode determines the order that the pixels in the current block are scanned to generate the predicted intraframe candidate. For example, the intraframe prediction mode can specify vertical scanning, horizontal scanning, diagonal down-left scanning, diagonal down-right scanning, vertical left scanning, vertical right scanning, horizontal down scanning, horizontal up scanning, and/or the like.

To perform intraframe prediction, controller 405 generates an intraframe candidate based on the selected intraframe prediction mode. Controller 405 scans the pixel values in the current block in the order specified by the selected intraframe prediction mode. For each scanned pixel, controller 405 determines a predicted pixel value based on differences between the pixel value and the pixel values of pixels that neighbor the pixel. From the predicted pixel values, controller 405 generates the intraframe candidate.

Controller 405 employs various other units included in video encoder 400 to perform the operations described herein. In that regard, controller 405 employs FPS unit 410 to perform full-pixel motion estimation. FPS unit 410 performs a full-pixel search using integer pixel addresses to generate motion estimation data between pixels of a current media frame and corresponding pixels of a previous media frame and/or a following media frame on a pixel-by-pixel basis. Similarly, controller 405 employs SPS unit 415 to perform sub-pixel motion estimation. SPS unit 415 performs a subpixel search using fractional pixel addresses to generate motion estimation data between subpixels of a current media frame and corresponding subpixels of a previous media frame and/or a following media frame on a subpixel-by-subpixel basis. Each subpixel can be one-half the size of a full pixel, one-fourth the size of a full pixel, and/or the like.

Controller 405 employs MCT unit 420 to perform motion compensation. MCT unit 420 selects a filter type to perform motion compensation prediction. MCT unit 420 selects a motion compensation filter type to account for the interpolation of subpixels resulting from fractional motion vectors. Subpixels can be determined by filtering full pixels and full pixel motion vectors. Motion compensation filter types can include bicubic filtering, bilateral filtering, and/or the like.

RCOL unit 455 reads collocated motion vector data from memory and stores this collocated motion vector data in memory for access during motion estimation and/or other encoding operations. This collocated motion vector data for a previous media frame is previously written to memory by MPEC unit 467.

RMVP unit 459 reads motion vector prediction data, also referred to as motion vector hint data, from memory. In some embodiments, this motion vector hint data is previously written to memory by WMVP unit 477.

MDP unit 465 determines the mode for encoding each block of the media frame. The potential modes can be interframe mode, intraframe mode, and/or the like. In some embodiments, MDP unit 465 encodes the current block according to multiple encoding modes and selects the mode that yields the lowest cost, where the lowest cost yields the least amount of residue data for the block. MDP unit 465 determines the final selection among all candidates from motion estimation, determines the optimal partitioning for interframe encoding, and determines the final selection between interframe encoding and intraframe encoding. Further, MDP unit 465 can generate motion estimation result data, motion compensation result data, and/or the like.

MPEB unit 466 performs and/or supports various functions for video encoder 400. These functions can include, without limitation, intraframe prediction, block size search and/or subblock size search, reconstruction, deblocking filtering, sample adaptive offset (SAO) filtering, and/or the like. Further, these functions can include, without limitation, transformation, quantization, inverse quantization, and inverse transformation, described herein.

MPEC unit 467 performs and/or supports various functions for video encoder 400. These functions can include, without limitation, certain entropy coding modes, such as context-adaptive variable length coding (CAVLC), context-based adaptive binary arithmetic coding (CABAC), and/or the like.

History unit 470 stores data to memory and loads data from memory, where the data includes spatial hints, intraframe predictions, SAO filtering data, and entropy encoding data for the current block row and/or previous block row encoded by video encoder 400. History unit 470 can receive data from processed blocks in one block row that will be accessed again during encoding of blocks in the next block row. As a result, various units of video encoder 400 can access data for neighboring blocks in the block row above the current block row being encoded.

WMVP unit 477 writes motion vector prediction data, also referred to as motion vector hint data, for each media frame into memory. This motion vector hint data can be used as hint data when video encoder 400 encodes the following media frames. In so doing, RMVP unit 459 can read this motion vector hint data from memory.

Rate-distortion optimization unit 425 performs rate-distortion optimization for the blocks included in a media frame of the video stream. Rate-distortion optimization unit 425 selects a winning candidate for a block between the interframe candidate for that block and the intraframe candidate for that block. Rate-distortion optimization unit 425 selects a winning candidate based, in part, on a predicted importance value generated from forward prediction hint data and backward prediction hint data. Rate-distortion optimization unit 425 further receives the reconstructed pixels of the block in the reconstructed current media frame from reconstruction unit 430 via the feedback loop from reconstruction unit to FPS unit 410. Based on the reconstructed pixels of the block in the reconstructed current media frame, rate-distortion optimization unit 425 determines a rate-distortion cost value based on the sum of square errors (SSE) distortion for the current block. Rate-distortion optimization unit 425 selects the winning candidate based at least in part on the rate-distortion cost value for the current block as determined from the interframe cost value and the intraframe cost value. In some embodiments, rate-distortion optimization unit 425 further performs a transformation operation and/or a quantization operation on the block as part of the encoding process. Rate-distortion optimization unit 425 can further determine various mode selections including, without limitation, block size and/or type selection, transform size and/or type selection, and/or the like.

Reconstruction unit 430 performs image reconstruction for the blocks included in a media frame of the video stream based on mode selection results received from rate-distortion optimization unit 425. Reconstruction unit 430 performs image reconstruction on frequency coefficients that have previously been transformed and quantized during the encoding process. Reconstruction unit 430 performs an inverse quantization function to reverse the quantization previously performed on the block. Reconstruction unit 430 performs an inverse transformation function to reverse the transformation previously performed on the block. In so doing, reconstruction unit 430 generates reconstructed residue data. Reconstruction unit 430 sums the reconstructed residue data with the winning candidate generated by rate-distortion optimization unit 425 to generate the reconstructed current image block. The reconstructed current image block is a proxy of the corresponding block of the media frame that a video decoder generates when decoding the video stream generated by video encoder 400. In some embodiments, reconstruction unit 430 can improve visual quality of the video stream by performing secondary type search and/or size search for interframe encoding. Reconstruction unit 430 can also improve visual quality of the video stream by performing intraframe encoding mode search based on accurate neighbor pixel data.

Filter 435 performs one or more filtering techniques for the blocks included in a media frame of the video stream. The one or more filtering techniques can include deblocking filtering, sample adaptive offset filtering, and/or the like. With deblocking filtering, filter 435 improves the visual quality of the reconstructed current block of the media frame by smoothing the sharp edges resulting from the transformation and/or quantization performed by rate-distortion optimization unit 425 during encoding followed by the inverse quantization and/or inverse transformation performed by reconstruction unit 430 during reconstruction. With sample adaptive offset filtering, filter 435 further filters the reconstructed current block of the media frame by selectively adding offsets to the pixel values of the reconstructed current block of the media frame based on the pixel value of a given pixel and/or the pixel values of one or more neighbor pixels.

Entropy encoder 440 generates the final encoded bitstream for video encoder 400 from the encoded blocks generated by filter 435. In some embodiments, entropy encoder 440 generates the final encoded bitstream, that is, the output video stream, using a lossless compression technique. Additionally or alternatively, entropy encoder 440 generates the final encoded bitstream using a lossy compression technique. Entropy encoder 440 encodes the blocks of a media frame sequentially in raster scan order. In so doing, entropy encoder 440 waits for the final winning candidate data for each sequential block to be generated prior to encoding the bit stream for that block. In this manner, entropy encoder 440 encodes the blocks of each block row of the image sequentially and one at a time in raster scan order. In raster scan order, entropy encoder 440 encodes blocks on each block row of the media frame from left to right and encodes the block rows of the media frame from top to bottom. As entropy encoder 440 completes encoding of the blocks in each media frame, entropy encoder 440 stores the encoded blocks in an appropriate location in frame buffer memory via frame buffer interface 480.

Video encoder 400 includes various memory-related units and/or components including, without limitation, DMA engines and cache memory 460. DMA engines, such as PDMA unit 450, RHINT unit 457, and MEDMA unit 475, can perform block copies of data and/or commands from one location in memory to another location in memory. More specifically, DMA engines can copy a block of data and/or commands within a particular memory or between one memory and another memory. Therefore, DMA engines can copy a block of data and/or commands within or between any one or more of shared memory, PP memory 204, system memory 104, and/or the like.

In particular, PDMA unit 450 is a pixel DMA unit that loads original media frame data from memory. PDMA unit 450 can buffer multiple blocks of the original media frame pixel data for motion estimation operations and for MPEC unit 467. PDMA unit 450 stores this original media frame data in local memory for access by FPS unit 410 and/or other units and components of video encoder 400. RHINT unit 457 loads external motion vector hint data from memory. RHINT unit 457 stores this external motion vector hint data in local memory for access by FPS unit 410 and/or other units and components of video encoder 400. MEDMA unit 475 stores data generated by MDP unit 465 in memory. In particular, MEDMA unit 475 can store motion estimation result data, motion compensation result data, original pixel data, and/or the like to a dedicated MEDMA buffer in memory.

Cache memory 460 can store short term data and/or commands that have been recently accessed by, or is predicted to soon be accessed by, various units and/or components of video encoder 400. These units include, without limitation, FPS unit 410, SPS unit 415, MCT unit 420, and/or the like. In particular, cache memory 460 can store reference pixels included in reference media frames for the units of video encoder 400. The data and/or commands stored in cache memory 460 can be a copy of data and/or commands stored in another memory including, without limitation, shared memory, PP memory 204, system memory 104, and/or the like. Typically, access times to load data from and/or store data to cache memory 460 is lower than loading data from and/or storing data to these other memories.

Via frame buffer interface 480, the units and/or components of video encoder 400 can access frame buffer memory (not shown) via frame buffer interface 480. The frame buffer memory can be a special purpose memory for storing image data or can be a portion of another memory including, without limitation, PP memory 204, system memory 104, and/or the like. In some embodiments, frame buffer interface 480 can support data write operations from units of video encoder 400 to memory concurrently with data read operations from memory to video encoder 400.

In some embodiments, video encoder 400 can include feedback loops from a later stage to an earlier stage. For example, the visual quality of the output video stream can be improved with a feedback loop from rate-distortion optimization unit 425 to FPS unit 410 and, via FPS unit 410, to SPS unit 415 and MCT unit 420. With such a feedback loop, FPS unit 410, SPS unit 415, and MCT unit 420 can generate motion vector data for the current block to generate the motion vector for the following block. In this manner, video encoder 400 can generate a motion vector for the current block based on pixel data from the current block as well as the motion vector from the previous block and/or the motion vector from the following block, resulting in improved motion estimation. This improved motion estimation, in turn, can result in improved motion compensation.

Figure 5:
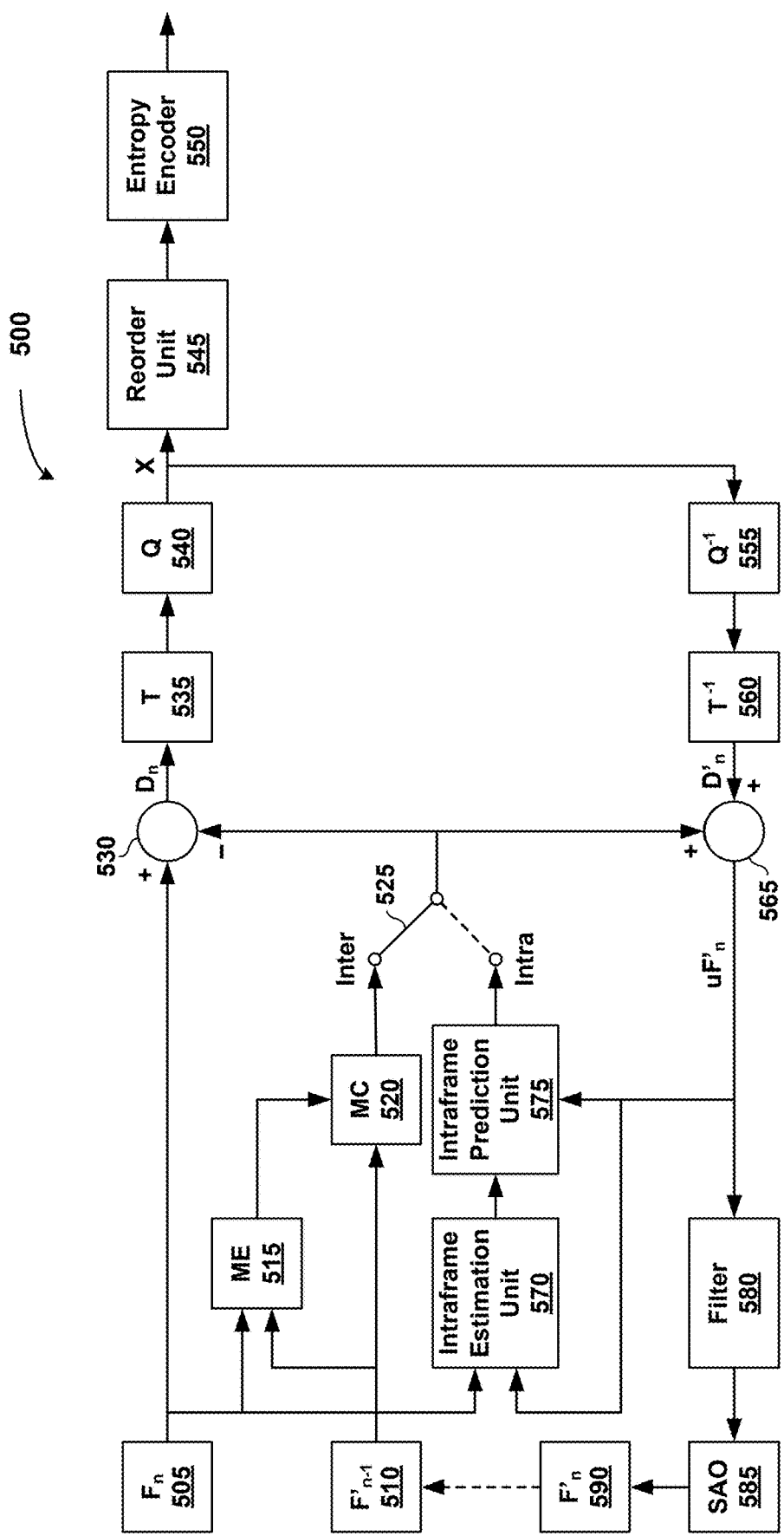
FIG. 5 illustrates a functional view of a video encoder that can encode a media frame for the computing system of FIGS. 1-4, according to various embodiments.

FIG. 5 illustrates a functional view of a video encoder 500 that can encode a media frame for the computing system 100 of FIGS. 1-4, according to various embodiments. The video encoder 500 can encode a video stream compatible with the high efficiency video coding (HEVC) standard also known as H.265 or motion picture experts group high efficiency (MPEG-H) Part 2 format. Additionally or alternatively, the video encoder 500, as is and/or with slight modification, can encode a video stream compatible with any other technically feasible video encoding standard.

As shown, the video encoder 500 receives an input media frame to be encoded. This received media frame is referred to as the current media frame ($F_n$) 505. The current media frame ($F_n$) 505, and other media frames processed by video encoder 500, is divided into multiple blocks. Each block includes a group of neighboring pixels, such as an 8×8 block of pixels, a 16×16 block of pixels, and/or the like. Each block is further divided into partitions, where each partition includes luminance pixels (luma pixels) and/or chrominance pixels (chroma pixels). Luma pixels include the luma, or Y, pixel values for the pixels in the block. Chroma pixels include the chroma pixel values for the pixels in the block. Chroma pixel values are typically color difference values, also referred to as chrominance difference values, and can be of two types: (1) red color difference (U or $C_r$) pixel values; and (2) blue color difference (V or $C_b$) pixel values.

The video encoder 500 also includes a reconstructed media frame based on the previously received and encoded media frame. This reconstructed media frame is referred to as the reference media frame ($F'_{n-1}$) 510. Based on the current pixels in the current media frame ($F_n$) 505 and on the reference pixels in the reference media frame ($F'_{n-1}$) 510, motion estimation unit (ME) 515 generates a motion vector for the current block that is predictive of the block of the current media frame from the corresponding block of the reference media frame. The reference media frame can be a previous media frame and/or a following media frame. The video encoder 500 can use the motion vector as an interframe candidate. Motion estimation unit 515 transmits the interframe candidate to motion compensation unit (MC) 520. Motion compensation unit 520 generates motion compensated pixels for the interframe candidate. Motion compensation unit 520 transmits the motion compensated pixels for the interframe candidate to the "inter" input of selector 525.

In addition, based on the current pixels in the current media frame ($F_n$) 505 and on the neighboring pixels of the reconstructed current media frame $uF'_n$ received from summer 565, intraframe estimation unit 570 selects an intraframe prediction mode. In some embodiments, intraframe estimation unit 570 can select the intraframe prediction mode that best predicts the pixels of the current block. Intraframe estimation unit 570 can select the intraframe prediction mode that results in the lowest rate-distortion cost value based on the sum of square errors (SSE) distortion for the current block as determined by the rate-distortion optimization unit of selector 525. The number and type of available prediction modes can vary based on the block size. For example, the number and type of available prediction modes can be different among 4×4 pixel blocks, 8×8 pixel blocks, 16×16 pixel blocks, 32×32 pixel blocks, and/or the like. In that regard, intraframe estimation unit 570 can select different prediction modes for each of the possible block sizes based on what prediction mode results in lowest rate-distortion cost value determined by the rate-distortion optimization unit for the respective block size. Further, intraframe estimation unit 570 can select different prediction modes for the luma values in the block versus the chroma samples in the block. In some embodiments, the prediction mode determines the order that the pixels in the current block are scanned to generate the predicted intraframe candidate. For example, the prediction mode can specify vertical scanning, horizontal scanning, diagonal down-left scanning, diagonal down-right scanning, vertical left scanning, vertical right scanning, horizontal down scanning, horizontal up scanning, and/or the like.

Based on the selected intraframe prediction mode, intraframe prediction unit 575 generates an intraframe candidate. Intraframe prediction unit 575 scans the pixel values in the current block in the order specified by the selected intraframe prediction mode. For each scanned pixel, intraframe prediction unit 575 determines a predicted pixel value based on differences between the pixel value and the pixel values of pixels that neighbor the pixel. From the predicted pixel values, intraframe prediction unit 575 generates the intraframe candidate. Intraframe prediction unit 575 transmits the intraframe candidate to the "intra" input of selector 525.

Selector 525 determines whether to select the compensated pixels for the interframe candidate received from motion compensation unit 520 or the intraframe candidate received from intraframe prediction unit 575. The determination of selecting the interframe candidate or the intraframe candidate can occur at any level of granularity, including, without limitation, on a block by block basis, on a media frame by media frame basis, and/or the like. The technique for determining whether to select the interframe candidate or the intraframe candidate can be relatively simple or relatively complex. Typically, the more complex the technique used to determine whether to select the interframe candidate or the intraframe candidate, the higher the video quality of the resulting encoded stream. The selected candidate between the interframe candidate and the intraframe candidate is referred to as the winning candidate. In some embodiments, selector 525 determines the winning candidate based solely on luma pixel values. In some embodiments, selector 525 determines the winning candidate based on both luma pixel values and chroma pixel values. In general, basing the selection on both luma pixel values and chroma pixel values can be more accurate, and therefore result in higher visual quality, than basing the selection on luma pixel values alone.

In some embodiments, when selecting the winning candidate, selector 525 can also perform rate-distortion optimization (RDO). The rate-distortion optimization unit (not shown in FIG. 5) of selector 525 receives the interframe candidate and the intraframe candidate. The rate-distortion optimization unit further receives the reconstructed pixels of the reconstructed current media frame $uF'_n$ received from inverse quantization unit 555, inverse transform unit 560, and summer 565. Based on the reconstructed pixels of the reconstructed current media frame $uF'_n$, the rate-distortion optimization unit determines a rate-distortion cost value based on the sum of square errors (SSE) distortion for the current block. Selector 525 selects the winning candidate based at least in part on the rate-distortion cost value for the current block as determined by the rate-distortion optimization unit. Selector 525 transmits the winning candidate to summer 530 and summer 565.

Summer 530 inverts the winning candidate received from selector 525 before combining the winning candidate with current media frame $(F_n)$ 505. As a result, summer 530 determines the difference resulting from subtracting the winning candidate from current media frame $(F_n)$ 505. This difference is referred to as residue pixels, residue data, or, more generally, the residue $D_n$. Summer 530 transmits the residue $D_n$ to transform unit (T) 535.

Transform unit 535 converts the residue $D_n$ received from summer 530 into an array of frequency coefficients that represent the image portion included in each block. Transform unit 535 transmits the frequency coefficients to quantization unit (Q) 540. Quantization unit 540 reduces the total number of unique frequency coefficients received from transform unit 535 by quantizing the frequency coefficients according to defined frequency ranges or bins. Quantization unit 540 transmits the quantized frequency coefficients X to reorder unit 545. Reorder unit 545 sorts the quantized frequency coefficients X in order of decreasing value, such that all coefficients with a value of zero ('0') are sorted to be at the end of the set of frequency coefficients. Reorder unit 545 transmits the sorted quantized frequency coefficients to entropy encoder 550. Entropy encoder 550 generates the final encoded bitstream for video encoder 500. In some embodiments, entropy encoder 550 generates the final encoded bitstream, that is, the output video stream, using a lossless compression technique. Additionally or alternatively, entropy encoder 550 generates the final encoded bitstream using a lossy compression technique. The final encoded bitstream generated by video encoder 500 can be subsequently decoded by a corresponding video decoder (not shown).

In addition to transmitting the quantized frequency coefficients X to reorder unit 545, quantization unit 540 transmits the quantized frequency coefficients X to inverse quantization unit $(Q^{-1})$ 555. Inverse quantization unit 555 performs an inverse quantization function to reverse the quantization performed by quantization unit 540. Inverse quantization unit 555 transmits the inverse quantized frequency coefficients to inverse transform unit $(T^{-1})$ 560. Inverse transform unit 560 performs an inverse transformation function to reverse the transformation performed by transform unit 535. In so doing, inverse transform unit 560 generates reconstructed residue data $D'_n$. Inverse transform unit 560 transmits the reconstructed residue data $D'_n$ to summer 565.

Summer 565 adds the reconstructed residue data $D'_n$ to the winning candidate generated by selector 525 to generate the reconstructed current media frame $uF'_n$. The reconstructed current media frame $uF'_n$ is a proxy of the media frame that a video decoder generates when decoding the video stream generated by video encoder 500. As described herein, summer 565 transmits the reconstructed current media frame $uF'_n$ to intraframe estimation unit 570 to generate the intraframe candidate in conjunction with intraframe prediction unit 575. In addition, summer 565 transmits the reconstructed current media frame $uF'_n$ to filter 580. In some embodiments, filter 580 is a deblocking filter that improves the visual quality of the reconstructed current media frame $uF'_n$. Filter 580 improves visual quality by smoothing the sharp edges resulting from the transformation performed by transform unit 535 and/or the quantization performed by quantization unit 540 followed by the inverse quantization performed by inverse quantization unit 555 and/or the inverse transformation performed by inverse transform unit 560. Filter 580 transmits the filtered image to sample adaptive offset filter (SAO) 585. Sample adaptive offset filter 585 further filters the reconstructed current media frame $uF'_n$ by selectively adding offsets to the pixel values of the reconstructed current media frame $uF'_n$ based on the pixel value of a given pixel and/or the pixel values of one or more neighbor pixels. Sample adaptive offset filter 585 stores the SAO filtered image as the final reconstructed current media frame $(F'_n)$ 590.

After video encoder 500 completes processing of the current media frame $(F_n)$ 505, video encoder 500 receives the following input media frame, which then becomes the new current media frame $(F_n)$ 505. Further, the reconstructed current media frame $(F'_n)$ 590 becomes the new reference media frame $(F'_{n-1})$ 510. Video encoder 500 uses this new reference media frame $(F'_{n-1})$ 510 to generate the interframe candidate for the new current media frame $(F_n)$ 505.

In some embodiments, the visual quality of the output video stream can be further improved with a feedback loop (not shown) from selector 525 to motion estimation unit 515. Upon selecting the winning candidate, selector 525 determines the final motion vector for the current block. Selector 525 transmits the final motion vector for the current block to motion estimation unit 515. Motion estimation unit 515 can use this final motion vector for the current block to generate the motion vector for the following block. In this manner, motion estimation unit 515 can generate a motion vector for the current block based on pixel data from the current block as well as the motion vector from the previous block and/or the motion vector from the following block, resulting in improved motion estimation. This improved motion estimation, in turn, can result in improved motion compensation as performed by motion compensation unit 520 and improved selection accuracy as performed by selector 525.

In some embodiments, a given block can include multiple subblocks or partitions. The subblocks can have various sizes. For example, a 16×16 pixel block can include 8×16 pixel subblocks, 16×8 pixel subblocks, 8×8 pixel subblocks, and/or the like, in any combination. In such embodiments, motion estimation unit 515 can generate a motion vector for each subblock and combine the motion vectors from the various subblocks to generate a final motion vector for the block.

In some embodiments, video encoder 500 can be implemented with the architecture of video encoder 400 of FIG. 4. In such embodiments, media frames, including, without limitation, current media frame $(F_n)$ 505, reference media frame $(F'_{n-1})$ 510, and reconstructed current media frame $(F'_n)$ 590, can be stored in any technically feasible memory. More specifically, these media frames can be stored in shared memory, cache memory 460, frame buffer memory, and/or the like. Motion estimation unit 515 and/or motion compensation unit 520 can represent, without limitation, controller 405, FPS unit 410, SPS unit 415, and MCT unit 420 of FIG. 4. Intraframe estimation unit 570 and/or intraframe prediction unit 575 can represent, without limitation, controller 405, MPEB unit 466, and history unit 470 of FIG. 4. One or more of selector 525 (including the rate-distortion optimization unit of selector 525), summer 530, transform unit 535, and/or quantization unit 540 can represent, without limitation, rate-distortion optimization unit 425 of FIG. 4. Inverse quantization unit 555, inverse transform unit 560, and/or summer 565 can represent, without limitation, reconstruction unit 430 of FIG. 4. Filter 580 and/or sample adaptive offset filter 585 can represent, without limitation, filter 435 of FIG. 4. Entropy encoder 550 can represent, without limitation, Entropy encoder 440 of FIG. 4.

It will be appreciated that the system shown herein is illustrative and that variations and modifications are possible. The techniques described herein can be performed by one or more alternative auxiliary processors including, without limitation, CPUs, GPUs, video encoders, DMA units, IPUs, NPUs, TPUs, NNPs, DPUs, VPUs, ASICs, FPGAs, and/or the like, in any combination. More generally, the techniques described herein can be applied to any CPU 102, PPU 202, video encoder, and/or any other processing unit in any combination.

Figure 6:
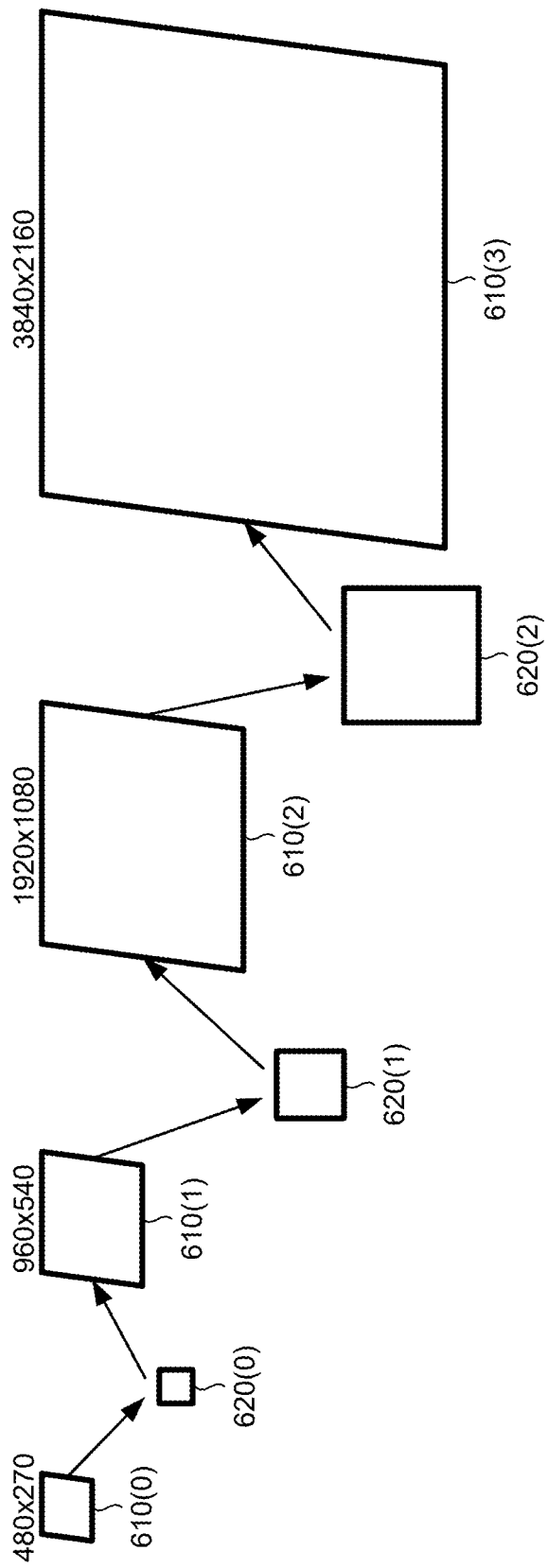
FIG. 6 illustrates how the video encoders of FIGS. 4-5 can perform pyramidal motion estimation, according to various embodiments.

FIG. 6 illustrates how the video encoders 400 and 500 of FIGS. 4-5 can perform pyramidal motion estimation, according to various embodiments. As shown, the video encoder 400 and/or 500, including controller 405 in conjunction with other units and/or components of video encoder 400 and 500, generates motion vector prediction data, also referred to as motion vector hint data or, simply, hint data, for each media frame in a set of four phases at four increasingly finer resolutions 610(0), 610(1), 610(2), and 610(3). The video encoder performs the final phase of motion estimation at the target resolution 610(3), which is the full resolution the current media frame.

The video encoder performs a first phase of pyramidal motion estimation at a coarse first resolution 610(0) of 480 pixels by 270 pixel rows. The resolution for the first phase is coarser than the full resolution of the current media frame. This coarse first resolution 610(0) is 1/64th of the final resolution 610(3). The video encoder generates first motion vector hint data 620(0) at the first resolution 610(0). To generate the first motion vector hint data 620(0), the video encoder generates one motion vector hint for each 16×16 pixel grid block at the first resolution 610(0). Consequently, the video encoder generates a total of 510 motion vector hints, consisting of 30 motion vector hints for the 30 grid blocks per grid block row times the 17 grid block rows at the first resolution 610(0). Further, for each motion vector hint, the video encoder includes a forward prediction hint based on a reference media frame previous to the current media frame and a backward prediction hint based on a reference media frame that follows the current media frame.

The video encoder accesses the first motion vector hint data 620(0) and scales the first motion vector hint data 620(0) to the scale of a second phase of pyramidal motion estimation. The resolution for the second phase is coarser than the full resolution of the current media frame but finer than the resolution of the first phase. The video encoder uses the first motion vector hint data 620(0) as a starting point to perform the second phase of pyramidal motion estimation at a finer second resolution 610(1) of 960 pixels by 540 pixel rows. This finer second resolution 610(1) is 1/16th of the final resolution 610(3). The video encoder generates second motion vector hint data 620(1) at the second resolution 610(1). To generate the second motion vector hint data 620(1), the video encoder generates one motion vector hint for each 16×16 pixel grid block at the second resolution 610(1). Consequently, the video encoder generates a total of 2040 motion vector hints, consisting of 60 motion vector hints for the 60 grid blocks per grid block row times the 34 grid block rows at the second resolution 610(1). Further, for each motion vector hint, the video encoder includes a forward prediction hint based on a reference media frame previous to the current media frame and a backward prediction hint based on a reference media frame that follows the current media frame.

The video encoder accesses the second motion vector hint data 620(1) and scales the second motion vector hint data 620(1) to the scale of a third phase of pyramidal motion estimation. The resolution for the third phase is coarser than the full resolution of the current media frame but finer than the resolution of the first phase and the second phase. The video encoder uses the second motion vector hint data 620(1) as a starting point to perform the third phase of pyramidal motion estimation at an even finer third resolution 610(2) of 1920 pixels by 1080 pixel rows. This finer third resolution 610(2) is 1/4th of the final resolution 610(3). The video encoder generates third motion vector hint data 620(2) at the third resolution 610(2). To generate the third motion vector hint data 620(2), the video encoder generates one motion vector hint for each 16×16 pixel grid block at the third resolution 610(2). Consequently, the video encoder generates a total of 8160 motion vector hints, consisting of 120 motion vector hints for the 120 grid blocks per grid block row times the 68 grid block rows at the third resolution 610(2). Further, for each motion vector hint, the video encoder includes a forward prediction hint based on a reference media frame previous to the current media frame and a backward prediction hint based on a reference media frame that follows the current media frame.

The video encoder accesses the third motion vector hint data 620(2) and scales the third motion vector hint data 620(2) to the scale of a fourth phase of pyramidal motion estimation. The video encoder uses the third motion vector hint data 620(2) as a starting point to perform the fourth phase of pyramidal motion estimation at the fourth resolution 610(3) of 3840 pixels by 2160 pixel rows. This fourth resolution 610(3) is at the full final resolution.

By performing pyramidal motion estimation, the video encoder can perform an initial phase of motion estimation at a coarse resolution to limit the number of grid blocks to search in the reference media frame(s) to search for matching blocks in the reference media frame with pixel data that is closest to the pixel data of the blocks in the current media frame. Consequently, the video encoder can perform this initial phase of motion estimation at the coarse resolution with relatively low latency. Further, the video encoder uses the motion vector hint data generated during this initial phase as a starting point to search for matching blocks in the reference media frame(s) during the second phase of pyramidal motion estimation. As a result, rather than search all of the blocks of the reference media frames, the video encoder can limit the search area during the second phase to nearby blocks that surround the block indicated by the motion estimation data generated during the initial phase.

Further, at each subsequent phase of pyramidal motion estimation, the video encoder uses the motion vector hint data generated during the prior phase as a starting point to search for matching blocks in the reference media frame(s) during the current phase of pyramidal motion estimation. As a result, rather than search all of the blocks of the reference media frames, the video encoder can limit the search area during the each subsequent phase to nearby blocks that surround the block indicated by the motion estimation data generated during the prior phase. The video encoder continues to perform pyramidal motion estimation in phases until the video encoder performs motion estimation at the final resolution. With this phased approach, the video encoder can perform motion estimation with greater performance and lower latency than performing motion estimation at the full final resolution in a single pass.

Further, by generating motion vector hints for each 16×16 pixel grid block, the video encoder generates more motion vector hint data than approaches that generate a single hint per coding tree block. This approach can lead to higher visual quality in the media frames of the video stream, particularly in scenes with multiple objects moving in different directions. In addition, by generating motion vector hints that include both forward prediction hints and backward prediction hints, the video encoder generates more motion vector hint data than approaches that generate only forward prediction hints. This approach can lead to higher visual quality in the media frames of the video stream, particularly in scenes where objects are moving at rapid speed and/or are quickly changing directions between media frames.

It will be appreciated that the system shown herein is illustrative and that variations and modifications are possible. As shown in FIG. 6, the video encoder performs pyramidal motion estimation in four phases, from a first phase at a 480×270 resolution to a fourth phase at a 3840×2160 final resolution. However, the disclosed techniques can be applied to pyramidal motion estimation over more than four phases or fewer than four phases. Further, the disclosed techniques can be applied at any initial resolution, any final resolution, and any intermediate resolution(s). Further, the disclosed techniques can be applied to a grid with any grid block size alternative or in addition to a 16×16 pixel grid block size.

Figure 7:
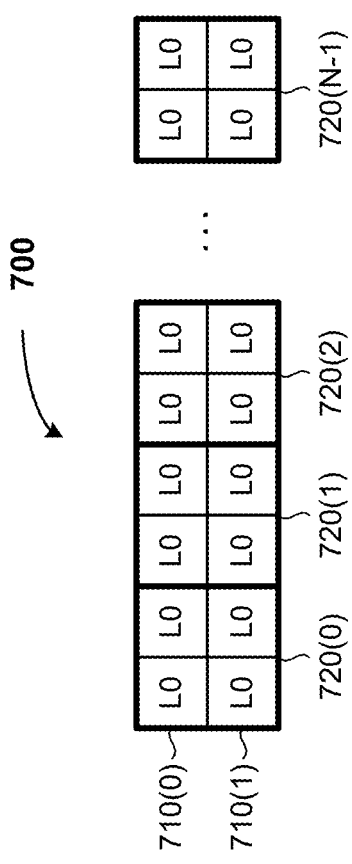
FIG. 7 illustrates storage of forward prediction hint data for a media frame encoded in H.265 format by the video encoders of FIGS. 4-5, according to various embodiments.

FIG. 7 illustrates storage of forward prediction hint data for a media frame encoded in H.265 format by the video encoders 400 and 500 of FIGS. 4-5, according to various embodiments. As shown, controller 405, in conjunction with other units and/or components of video encoder 400, generates motion vector prediction data, also referred to as motion vector hint data or, simply, hint data, for each media frame. Controller 405 stores the hint data in a hint block row 700. The hint data for hint block row 700 includes N hint blocks 720(0), 720(1), 720(2), . . . , 720(N−1), where each hint block 720 includes 4 forward predicted hints. Each hint block 720 includes 4 forward predicted hints, labeled L0, arranged as 2 rows 710(0), 710(1), where each row 710 includes 2 forward predicted hints. In some examples, each hint block 720 represents a coding tree block of 32×32 pixels and each hint include in the hint block 720 represents a 16×16 pixel grid block within the 32×32 pixel coding tree block. Controller 405, in conjunction with other units and/or components of video encoder 400, generates forward predicted hints and stores the forward predicted hints in the L0 slots of each hint block 720. In some embodiments, controller 405 generates the forward predicted hints block by block. In such embodiments, controller generates and stores forward predicted hints for hint block 720(0) at the left end of hint block row 700, followed by forward predicted hints for hint block 720(1), followed by forward predicted hints for hint block 720(2), and so on for the remining hint blocks, ending with forward predicted hints for hint block 720(N−1).

After generating the hint blocks 720 for hint block row 700, controller 405 generates forward predicted hints for the other block rows from the top of the media frame to the bottom of the media frame. After the forward predicted hint data are stored in all of the hint blocks 720 of hint block row 700, WMVP unit 477 stores the forward predicted hint data for hint block row 700 in memory. In some embodiments, WMVP unit 477 stores the hint data row-by-row. In such embodiments, WMVP unit 477 stores the hint data for row 710(0) from left to right, followed by the hint data for row 710(1). Subsequently, RMVP unit 459 loads the forward predicted hint data for hint block row 700 into local memory for further processing, as described herein.

Figure 8:
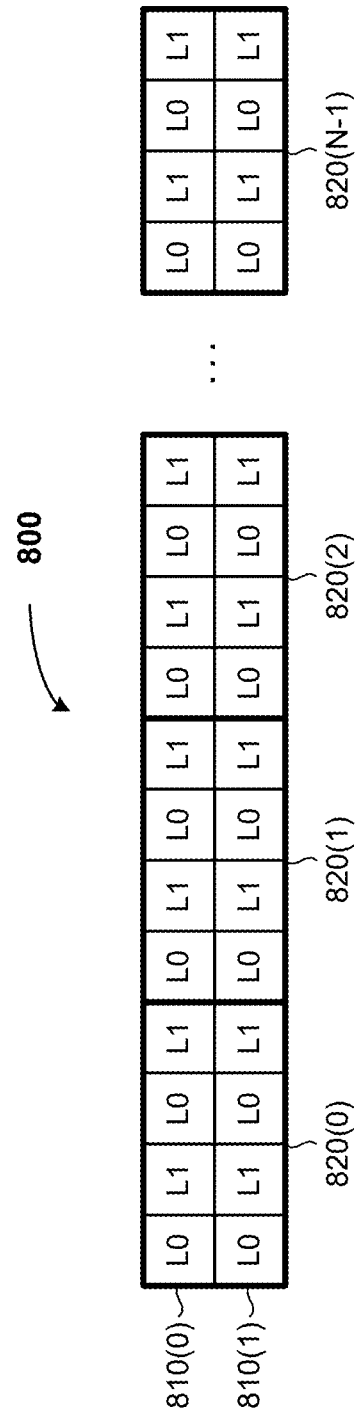
FIG. 8 illustrates storage of forward prediction hint data and backward prediction hint data for a media frame encoded in H.265 format by the video encoders of FIGS. 4-5, according to various embodiments.

FIG. 8 illustrates storage of forward prediction hint data and backward prediction hint data for a media frame encoded in H.265 format by the video encoders 400 and 500 of FIGS. 4-5, according to various embodiments. As shown, controller 405, in conjunction with other units and/or components of video encoder 400, generates motion vector prediction data, also referred to as motion vector hint data or, simply, hint data, for each media frame. Controller 405 stores the hint data in a hint block row 800. The hint data for hint block row 800 includes N hint blocks 820(0), 820(1), 820(2), . . . , 820(N−1), where each hint block 820 includes 4 forward predicted hints and 4 backward predicted hints. Each hint block 820 includes 4 forward predicted hints, labeled L0, and 4 backward predicted hints, labeled L1, arranged as 2 rows 810(0), 810(1), where each row 810 includes 2 forward predicted hints and 2 backward predicted hints. In some examples, each hint block 820 represents a coding tree block of 32×32 pixels and each hint represents a 16×16 pixel grid block within the 32×32 pixel coding tree block. Controller 405, in conjunction with other units and/or components of video encoder 400, generates forward predicted hints and stores the forward predicted hints in the L0 slots of each hint block 820. Further, controller 405, in conjunction with other units and/or components of video encoder 400, generates backward predicted hints and stores the backward predicted hints in the L1 slots of each hint block 820. In some embodiments, controller 405 generates the forward predicted hints and the backward predicted hints block by block. In such embodiments, controller generates and stores forward predicted hints and backward predicted hints for hint block 820(0) at the left end of hint block row 800, followed by forward predicted hints and backward predicted hints for hint block 820(1), followed by forward predicted hints and backward predicted hints for hint block 820(2), and so on for the remining hint blocks, ending with forward predicted hints and backward predicted hints for hint block 820(N−1).

After generating the hint blocks 820 for hint block row 800, controller 405 generates forward predicted hints and backward predicted hints for the other block rows from the top of the media frame to the bottom of the media frame. After the forward predicted hint data and the backward predicted hint data are stored in all of the hint blocks 820 of hint block row 800, WMVP unit 477 stores the forward predicted hint data and the backward predicted hint data for hint block row 800 in memory. In some embodiments, WMVP unit 477 stores the hint data row-by-row. In such embodiments, WMVP unit 477 stores the hint data for row 810(0) from left to right, followed by the hint data for row 810(1). Subsequently, RMVP unit 459 loads the forward predicted hint data and the backward predicted hint data for hint block row 800 into local memory for further processing, as described herein. Generating, storing, and subsequently loading both forward predicted hint data and backward predicted hint data can result in improved visual quality of the resulting encoded video stream relative to the approach using only forward predicted hint data, as described in conjunction with FIG. 7.

It will be appreciated that the system shown herein is illustrative and that variations and modifications are possible. As shown in FIGS. 7 and 8, each hint in the hint data is for a 16×16 pixel grid block and each block is a coding tree block of 32×32 pixels. As a result, the hint data for each coding tree block includes 4 hints or hint pairs. In that regard, the hint data for each block in FIG. 7 includes 4 forward prediction hints. Similarly, the hint data for each block in FIG. 8 includes 4 forward prediction hints and 4 backward prediction hints. However, the disclosed techniques can be applied to any type, size, and/or shape of blocks, as described herein. Further, each hint in the hint data can be for any size and/or shape of grid block. As a result, each block can correspond to any number of hints, where the number of hints per block equals the size of the block divided by the size of the grid block for one hint.

Figure 9:
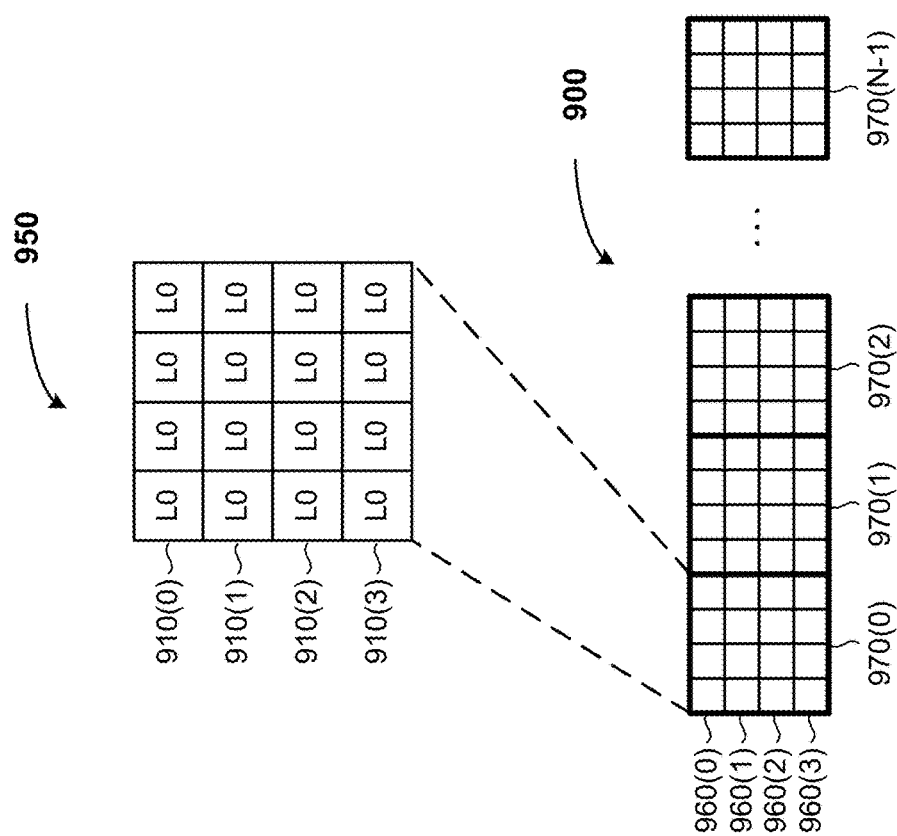
FIG. 9 illustrates storage of forward prediction hint data for a media frame encoded in AV1 format by the video encoders of FIGS. 4-5, according to various embodiments.

FIG. 9 illustrates storage of forward prediction hint data for a media frame encoded in AV1 format by the video encoders 400 and 500 of FIGS. 4-5, according to various embodiments. As shown, controller 405, in conjunction with other units and/or components of video encoder 400, generates motion vector prediction data, also referred to as motion vector hint data or, simply, hint data, for each media frame. Controller 405 stores the hint data in a hint block row 900. The hint data for hint block row 900 includes N hint blocks 970(0), 970(1), 970(2), . . . , 970(N−1), where each hint block 970 includes 16 forward predicted hints. Hint block 950 is an expanded view of hint block 970(0). Hint block 950 includes 16 forward predicted hints, labeled L0, arranged as 4 rows 910(0), 910(1), 910(2), 910(3), where each row 910 includes 4 forward predicted hints. In some examples, each hint block 970 represents a coding tree block of 64×64 pixels and each hint represents a 16×16 pixel grid block within the 64×64 pixel coding tree block. Controller 405, in conjunction with other units and/or components of video encoder 400, generates forward predicted hints and stores the forward predicted hints in the L0 slots of each hint block 970. In some embodiments, controller 405 generates the forward predicted hints block by block. In such embodiments, controller generates and stores forward predicted hints for hint block 970(0) at the left end of hint block row 900, followed by forward predicted hints for hint block 970(1), followed by forward predicted hints for hint block 970(2), and so on for the remining hint blocks, ending with forward predicted hints for hint block 970(N−1).

After generating the hint blocks 970 for hint block row 900, controller 405 generates forward predicted hints for the other block rows from the top of the media frame to the bottom of the media frame. After the forward predicted hint data are stored in all of the hint blocks 970 of hint block row 900, WMVP unit 477 stores the forward predicted hint data for hint block row 900 in memory. In some embodiments, WMVP unit 477 stores the hint data row-by-row. In such embodiments, WMVP unit 477 stores the hint data for row 960(0) from left to right, followed by the hint data for row 960(1), followed by the hint data for row 960(2), followed by the hint data for row 960(3). Subsequently, RMVP unit 459 loads the forward predicted hint data for hint block row 900 into local memory for further processing, as described herein.

Figure 10:
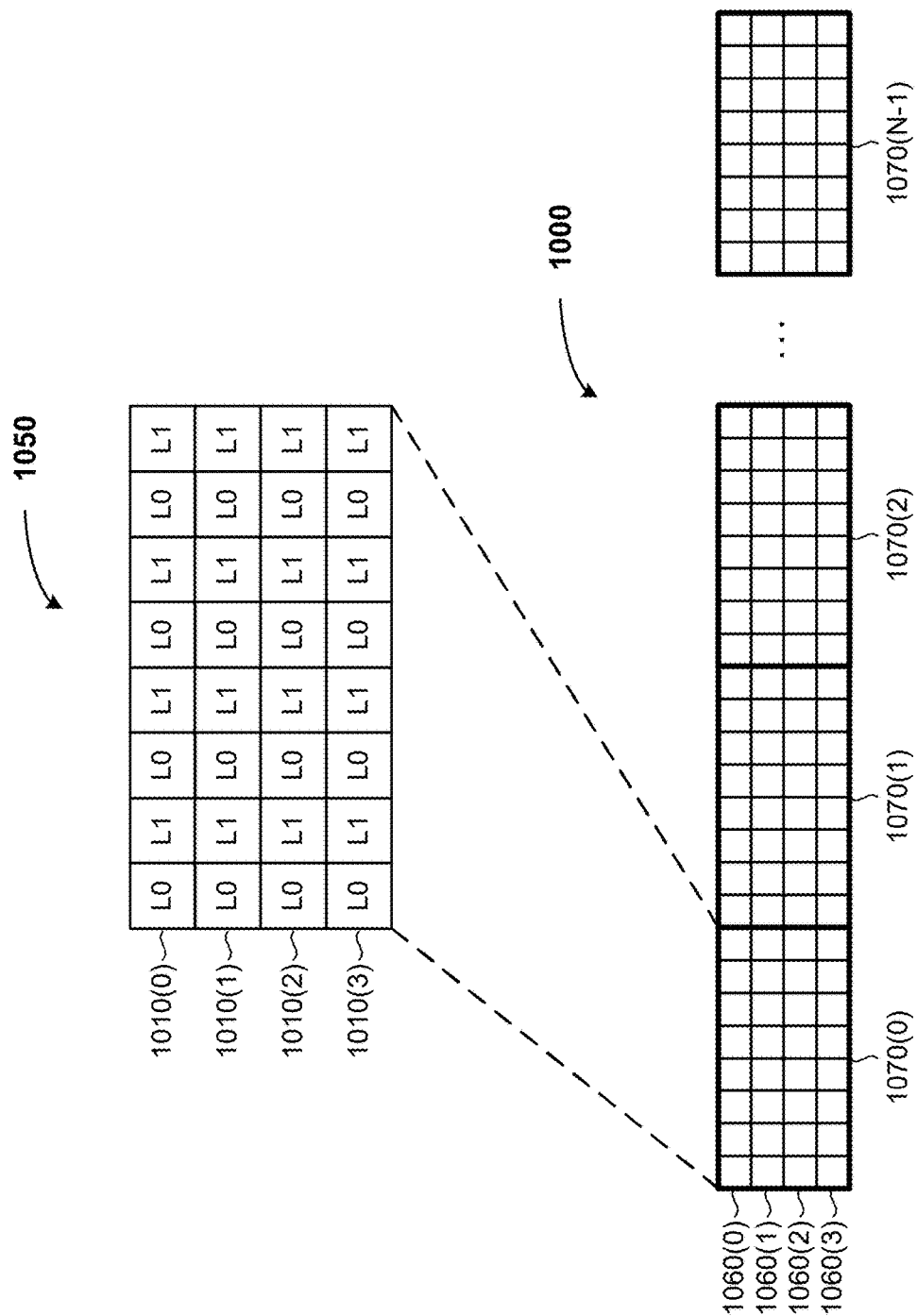
FIG. 10 illustrates storage of forward prediction hint data and backward prediction hint data for a media frame encoded in AV1 format by the video encoders of FIGS. 4-5, according to various embodiments.

FIG. 10 illustrates storage of forward prediction hint data and backward prediction hint data for a media frame encoded in AV1 format by the video encoders 400 and 500 of FIGS. 4-5, according to various embodiments. As shown, controller 405, in conjunction with other units and/or components of video encoder 400, generates motion vector prediction data, also referred to as motion vector hint data or, simply, hint data, for each media frame. Controller 405 stores the hint data in a hint block row 1000. The hint data for hint block row 1000 includes N hint blocks 1070(0), 1070(1), 1070(2), . . . , 1070(N−1), where each hint block 1070 includes 16 forward predicted hints and 16 backward predicted hints. Hint block 1050 is an expanded view of hint block 1070(0). Hint block 1050 includes 16 forward predicted hints, labeled L0, and 16 backward predicted hints, labeled L1, arranged as 4 rows 1010(0), 1010(1), 1010(2), 1010(3). Each row 1010 includes 4 forward predicted hints and 4 backward predicted hints. In some examples, each hint block 1070 represents a coding tree block of 64×64 pixels and each hint represents a 16×16 pixel grid block within the 64×64 pixel coding tree block. Controller 405, in conjunction with other units and/or components of video encoder 400, generates forward predicted hints and stores the forward predicted hints in the L0 slots of each hint block 1070. Further, controller 405, in conjunction with other units and/or components of video encoder 400, generates backward predicted hints and stores the backward predicted hints in the L1 slots of each hint block 1070. In some embodiments, controller 405 generates the forward predicted hints and the backward predicted hints block by block. In such embodiments, controller generates and stores forward predicted hints and backward predicted hints for hint block 1070(0) at the left end of hint block row 1000, followed by forward predicted hints and backward predicted hints for hint block 1070(1), followed by forward predicted hints and backward predicted hints for hint block 1070(2), and so on for the remining hint blocks, ending with forward predicted hints and backward predicted hints for hint block 1070(N−1).

After generating the hint blocks 1070 for hint block row 1000, controller 405 generates forward predicted hints and backward predicted hints for the other block rows from the top of the media frame to the bottom of the media frame. After the forward predicted hint data and the backward predicted hint data are stored in all of the hint blocks 1070 of hint block row 1000, WMVP unit 477 stores the forward predicted hint data and the backward predicted hint data for hint block row 1000 in memory. In some embodiments, WMVP unit 477 stores the hint data row-by-row. In such embodiments, WMVP unit 477 stores the hint data for row 1060(0) from left to right, followed by the hint data for row 1060(1), followed by the hint data for row 1060(2), followed by the hint data for row 1060(3). Subsequently, RMVP unit 459 loads the forward predicted hint data and the backward predicted hint data for hint block row 1000 into local memory for further processing, as described herein. Generating, storing, and subsequently loading both forward predicted hint data and backward predicted hint data can result in improved visual quality of the resulting encoded video stream relative to the approach using only forward predicted hint data, as described in conjunction with FIG. 9.

It will be appreciated that the system shown herein is illustrative and that variations and modifications are possible. As shown in FIGS. 9 and 10, each hint in the hint data is for a 16×16 pixel grid block and each block is a coding tree block of 64×64 pixels. As a result, the hint data for each coding tree block includes 16 hints or hint pairs. In that regard, the hint data for each block in FIG. 9 includes 16 forward prediction hints. Similarly, the hint data for each block in FIG. 10 includes 16 forward prediction hints and 16 backward prediction hints. However, the disclosed techniques can be applied to any type, size, and/or shape of blocks, as described herein. Further, each hint in the hint data can be for any size and/or shape of pixel grid block. As a result, each block can correspond to any number of hints, where the number of hints per block equals the size of the block divided by the size of the grid block for one hint.

Figure 11:
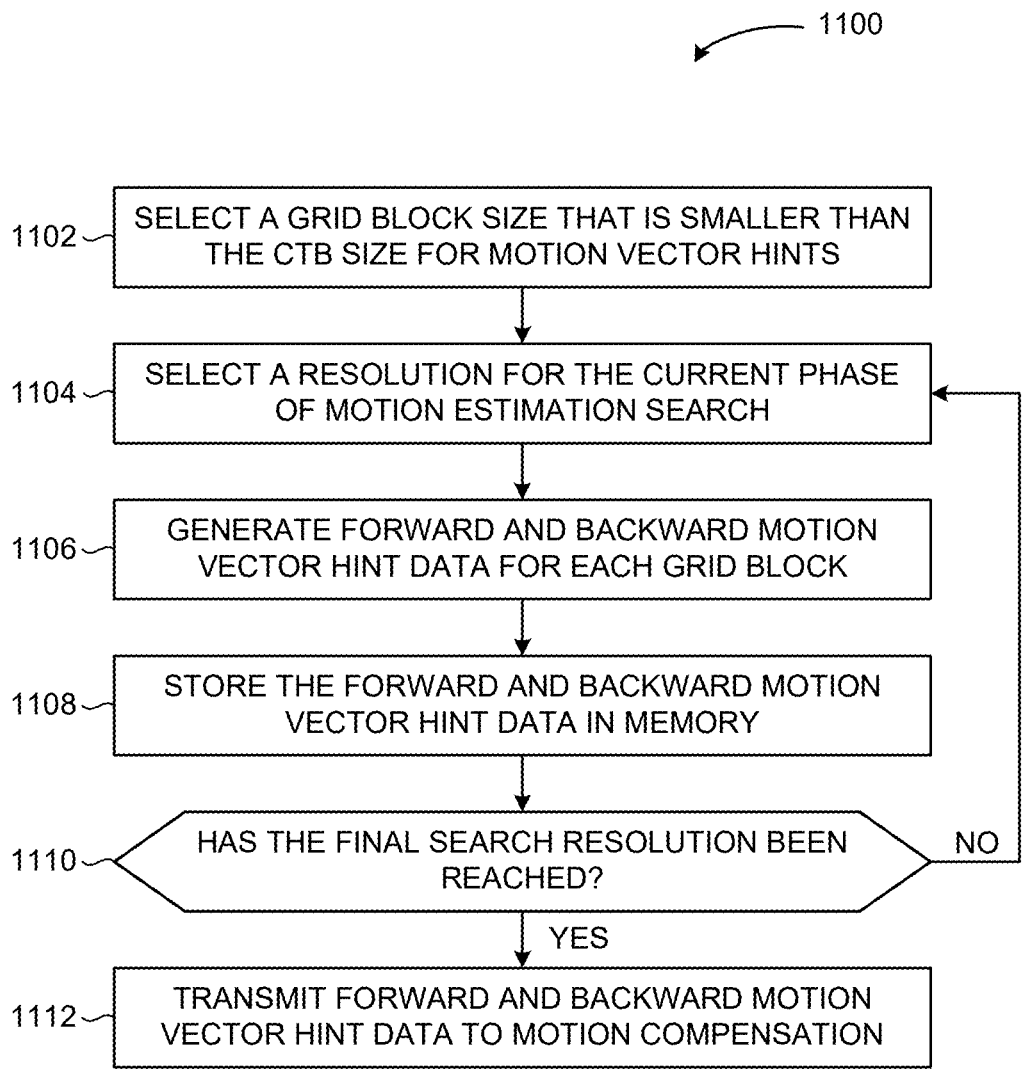
FIG. 11 is a flow diagram of method steps for performing motion estimation when encoding blocks of a media frame by the video encoders of FIGS. 4-5, according to various embodiments.

FIG. 11 is a flow diagram of method steps for performing motion estimation when encoding blocks of a media frame by the video encoders 400 and 500 of FIGS. 4-5, according to various embodiments. Additionally or alternatively, the method steps can be performed by one or more alternative auxiliary processors including, without limitation, microcontrollers, RISC processors, CPUs, GPUs, DMA units, IPUs, NPUs, TPUs, NNPs, DPUs, VPUs, ASICs, FPGAs, and/or the like, in any combination. Although the method steps are described in conjunction with the systems of FIGS. 1-10, persons of ordinary skill in the art will understand that any system configured to perform the method steps, in any order, is within the scope of the present disclosure.

As shown, a method 1100 begins at step 1102, where a video encoder, such as video encoder 400 and/or video encoder 500, selects a grid block size that is smaller than the coding tree block (CTB) size for motion vector hints. In some embodiments, the video encoder can encode a media frame in H.265 format, where the media frame is divided into 32×32 pixel coding tree blocks. In such embodiments, the video encoder can select a 16×16 pixel grid block size, such that each 32×32 pixel coding tree block encompasses four 16×16 pixel grid blocks. In some embodiments, the video encoder can encode a media frame in AV1 format, where the media frame is divided into 64×64 pixel coding tree blocks. In such embodiments, the video encoder can select a 16×16 pixel grid block size, such that each 64×64 pixel coding tree block encompasses sixteen 16×16 pixel grid blocks. Additionally or alternatively, the video encoder can encode a media frame with any size of coding tree block, macroblock, or other block type. Further, the video encoder can select any grid block size that is smaller than the coding tree block size, macroblock size, or other block size.

At step 1104, the video encoder selects a resolution for the current phase of motion estimation search. The initial resolution can be any resolution that is less than the full resolution of the media frame being encoded. For subsequent phases, the video encoder selects a resolution at increasingly finer resolutions until the final phase, where the video encoder selects the full resolution of the current media frame being encoded. In some embodiments, the video encoder can perform pyramidal motion estimation in four phases. In such embodiments, the video encoder can select a resolution for the first phase that is $\frac{1}{64}^{th}$ the resolution of the video frame being encoded, expressed as $\frac{1}{8}^{th}$ of the horizontal resolution times $\frac{1}{8}^{th}$ of the vertical resolution. The video encoder can select a resolution for the second phase that is $\frac{1}{16}^{th}$ the resolution of the video frame being encoded, expressed as $\frac{1}{4}^{th}$ of the horizontal resolution times $\frac{1}{4}^{th}$ of the vertical resolution. The video encoder can select a resolution for the third phase that is $\frac{1}{4}^{th}$ the resolution of the video frame being encoded, expressed as $\frac{1}{2}$ of the horizontal resolution times $\frac{1}{2}$ of the vertical resolution. The video encoder can select a resolution for the fourth and final phase that is the full resolution of the current video frame being encoded, expressed as the full horizontal resolution times the full vertical resolution.

At step 1106, the video encoder generates forward and backward motion vector hint data for each grid block. The video encoder performs motion estimation at the currently selected resolution to generate an interframe candidate for each grid block of the current media frame based on temporal redundancy between media frames. If the current phase of pyramidal motion estimation is not the initial phase, then the video encoder accesses the motion vector hints generated at a lower resolution during the previous phase. The video encoder uses this motion vector hint data as starting hint data for the current phase of pyramidal motion estimation at a higher resolution. The video encoder scales the motion vector hint from the previous phase to the resolution for the current phase. The video encoder uses the scaled motion vector hints as a starting point for the motion estimation search for the current phase.

The video encoder performs one or both of full-pixel search and/or subpixel search, by searching reference media frames, such as the previous media frame and/or the following media frame. More specifically, the video encoder searches the previous media frame to generate forward prediction motion vector hint data and searches the following media frame to generate backward prediction motion vector hint data. The video encoder searches the reference media frame for grid blocks that match corresponding grid blocks in the current media frame being encoded. A grid block in the reference media frame matches the grid block in the current media frame if the pixel data of the grid block in the reference media frame is the same as, or similar to, the pixel data of the current grid block in the current media frame. The matching grid block is the grid block in the reference media frame with pixel data that is closest to the pixel data of the grid block in the current media frame. If the objects in the scene have not moved and the camera view has not changed between the reference media frame and the current media frame, then the location of the current grid block within the current media frame can be the same as the location of the matching grid block in the reference media frame. If, however, the objects in the scene have moved and/or the camera view has changed between the reference media frame and the current media frame, then the location of the current grid block within the current media frame can be different from the location of the matching grid block in the reference media frame. The video encoder generates a motion vector hint for the current grid block in the current media frame that identifies the location of the matching grid block in the reference media frame.

At step 1108, the video encoder stores the forward and backward motion vector hint data in memory. The video encoder can store the forward and backward motion vector hint data in any one or more of cache memory, local memory, shared memory, PP memory 204, system memory 104, and/or the like. This motion vector hint data can be used as hint data for further phases of pyramidal motion estimation. Further, this motion vector hint data can be used when the video encoder encodes following media frames.

At step 1110, the video encoder determines whether the final search resolution has been reached. If the final search resolution has not been reached, then the method 1100 returns to step 1104, described above. If, however, the final search resolution has been reached, then the method 1100 proceeds to step 1112, where the video encoder transmits forward and backward motion vector hint data to motion compensation. The video encoder performs motion compensation to predict the pixels of a current media frame based on a previous media frame and/or a following media frame by determining effects caused by motion of the camera capturing the video stream and/or motion of objects within the scene captured by the camera. The video encoder generates difference data, also referred to as residue data, that specifies the differences between the pixel data of the matching block in the reference media frame and the pixel data of the current block in the current media frame. As the similarity of the pixel data of the block in the reference media frame to the pixel data of the current block increases, the amount of difference data decreases, resulting in a low interframe cost. Conversely, as the similarity of the pixel data of the block in the reference media frame to the pixel data of the current block decreases, the amount of difference data increases, resulting in a high interframe cost. After performing pyramidal motion estimation and motion compensation, the video encoder proceeds with additional steps in the encoding process for the current media frame.

The method 1100 then terminates. Alternatively, the method 1100 returns to step 1102 to perform pyramidal motion estimation on additional media frames. If the grid block size for the following media frame is the same as the grid block size for the current media frame, then the method 1100 can instead return to step 1104 to perform pyramidal motion estimation on the following media frame using the same grid block size as for the current media frame.

In sum, a video encoder generates multiple motion vector hints for each block of pixels in a media frame of a video stream. The video encoder divides the media frame into a grid size that is smaller than the block size. For example, the video encoder can divide the media frame into a grid of 16×16 pixel grid blocks. If the media frame includes blocks of 32×32 pixels, then the video encoder generates four motion vector hints for each block (one motion vector hint for each of the four 16×16 pixel grid blocks in the 32×32 pixel block). Similarly, if the media frame includes blocks of 64×64 pixels, then the video encoder generates sixteen motion vector hints for each block (one motion vector hint for each of the sixteen 16×16 pixel grid blocks in the 64×64 pixel block). Further, the video encoder generates each motion estimate hint with separate motion vector hint data for forward prediction and backward prediction.

At least one technical advantage of the disclosed techniques relative to the prior art is that, with the disclosed techniques, the video encoder generates multiple motion vector hints, such as four hints or sixteen hints, for each block of a media frame. As a result, the video encoder can generate media frames for a video stream with improved visual quality relative to prior approaches, particularly in scenes where many small objects are concurrently moving in different directions from one media frame to the following media frame. Further, the video encoder generates motion vector hints with separate motion vector hint data for forward prediction and backward prediction. As a result, the video encoder can generate media frames for a video stream with improved visual quality relative to prior approaches, particularly in scenes where objects are rapidly changing in speed and/or direction from one media frame to the following media frame. With these techniques, either alone or in combination, the video encoder can perform motion improved prediction accuracy for each subsequent phase of pyramidal motion estimation, leading to better visual quality of the resulting video stream. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing motion estimation when encoding blocks of a current media frame, the method comprising:
    selecting a first resolution that is coarser than the full resolution of the current media frame;
    dividing the current media frame into a first grid of grid blocks at the first resolution, where each grid block included in the first grid of grid blocks is smaller than an encoding block size of the current media frame; and
    generating a first motion vector hint for a first grid block included in the first grid of grid blocks based on a plurality of reference media frames,
    wherein the first motion vector hint is subsequently accessed to generate a second motion vector hint at a second resolution that is finer than the first resolution.

2. The computer-implemented method of claim 1, wherein the plurality of reference media frames comprises a media frame previous to the current media frame and a media frame following the current media frame.

3. The computer-implemented method of claim 2, wherein generating the first motion vector hint comprises:
    generating forward prediction motion vector hint data based on one or more media frames previous to the current media frame; and
    generating backward prediction motion vector hint data based on one or more media frames following the current media frame.

4. The computer-implemented method of claim 1, further comprising:
    selecting the second resolution that is finer than the first resolution and coarser than the full resolution of the current media frame;
    dividing the current media frame into a second grid of grid blocks at the second resolution, where each grid block included in the second grid of grid blocks is smaller than an encoding block size of the current media frame; and
    generating the second motion vector hint for a second grid block included in the second grid of grid blocks based on the first motion vector hint and on the plurality of reference media frames,
    wherein the second motion vector hint is subsequently accessed to generate a third motion vector hint at a third resolution that is finer than the second resolution.

5. The computer-implemented method of claim 4, wherein the first resolution is $1/64^{th}$ of the full resolution of the current media frame and the second resolution is $1/16^{th}$ of the full resolution.

6. The computer-implemented method of claim 1, wherein the first grid block comprises a 16×16 block of pixels.

7. The computer-implemented method of claim 1, wherein the encoding block size comprises a 32×32 block of pixels, a 64×64 block of pixels, or a 128×128 block of pixels.

8. The computer-implemented method of claim 1, wherein the current media frame is encoded according to H.264 format, H.265 format, Video comPression 9 (VP9) format, Alliance for Open Media (AOMedia) Video 1 (AV1) format, or versatile video coding (VVC) format).

9. The computer-implemented method of claim 1, wherein the full resolution comprises one of 720p (progressive format with 1280 pixels by 720 pixel rows), 1080p (progressive format with 1920 pixels by 1080 pixel rows), 4k (progressive format with 3840 pixels by 2160 pixel rows), or 8k (progressive format with 7680 pixels by 4320 pixel rows).

10. The computer-implemented method of claim 1, further comprising:
    selecting a second resolution that is the full resolution of the current media frame;
    dividing the current media frame into a second grid of grid blocks at the second resolution, wherein each grid block included in the second grid of grid blocks is smaller than an encoding block size of the current media frame;
    generating a second motion vector hint for a second grid block included in the second grid of grid blocks based on the first motion vector hint and on the plurality of reference media frames; and
    transmitting the second motion vector hint to a motion compensation processor.

11. A system comprising:
    a memory including pixel data for a current media frame; and
    a video encoder coupled to the memory that:
        selects a first resolution that is coarser than the full resolution of the current media frame;
        divides the current media frame into a first grid of grid blocks at the first resolution, where each grid block included in the first grid of grid blocks is smaller than an encoding block size of the current media frame; and
        generates a first motion vector hint for a first grid block included in the first grid of grid blocks based on a plurality of reference media frames,
        wherein the first motion vector hint is subsequently accessed to generate a second motion vector hint at a second resolution that is finer than the first resolution.

12. The system of claim 11, wherein the plurality of reference media frames comprises a media frame previous to the current media frame and a media frame following the current media frame.

13. The system of claim 12, wherein, to generate the first motion vector hint, the video encoder:
    generates forward prediction motion vector hint data based on one or more media frames previous to the current media frame; and
    generates backward prediction motion vector hint data based on one or more media frames following the current media frame.

14. The system of claim 11, wherein the video encoder further:
    selects the second resolution that is finer than the first resolution and coarser than the full resolution of the current media frame;

divides the current media frame into a second grid of grid blocks at the second resolution, where each grid block included in the second grid of grid blocks is smaller than an encoding block size of the current media frame; and generates the second motion vector hint for a second grid block included in the second grid of grid blocks based on the first motion vector hint and on the plurality of reference media frames, wherein the second motion vector hint is subsequently accessed to generate a third motion vector hint at a third resolution that is finer than the second resolution.

15. The system of claim 14, wherein the first resolution is $\frac{1}{64}^{th}$ of the full resolution of the current media frame and the second resolution is $\frac{1}{16}^{th}$ of the full resolution.

16. The system of claim 11, wherein the first grid block comprises a 16×16 block of pixels.

17. The system of claim 11, wherein the encoding block size comprises a 32×32 block of pixels, a 64×64 block of pixels, or a 128×128 block of pixels.

18. The system of claim 11, wherein the current media frame is encoded according to H.264 format, H.265 format, Video comPression 9 (VP9) format, Alliance for Open Media (AOMedia) Video 1 (AV1) format, or versatile video coding (VVC) format).

19. The system of claim 11, wherein the full resolution comprises one of 720p (progressive format with 1280 pixels by 720 pixel rows), 1080p (progressive format with 1920 pixels by 1080 pixel rows), 4k (progressive format with 3840 pixels by 2160 pixel rows), or 8k (progressive format with 7680 pixels by 4320 pixel rows).

20. The system of claim 11, wherein the video encoder further:

selects a second resolution that is the full resolution of the current media frame;

divides the current media frame into a second grid of grid blocks at the second resolution, wherein each grid block included in the second grid of grid blocks is smaller than an encoding block size of the current media frame;

generates a second motion vector hint for a second grid block included in the second grid of grid blocks based on the first motion vector hint and on the plurality of reference media frames; and transmits the second motion vector hint to a motion compensation processor.

\* \* \* \* \*